United States Patent
Mufti et al.

(10) Patent No.: US 11,140,580 B2
(45) Date of Patent: *Oct. 5, 2021

(54) SERVICE ENABLEMENT BASED ON ACCESS NETWORK

(71) Applicant: T-Mobile USA, Inc., Bellevue, WA (US)

(72) Inventors: Shujaur Mufti, Snoqualmie, WA (US); Khurram Ahmad Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/583,948

(22) Filed: Sep. 26, 2019

(65) Prior Publication Data

US 2020/0029248 A1    Jan. 23, 2020

Related U.S. Application Data

(63) Continuation of application No. 15/858,517, filed on Dec. 29, 2017, now Pat. No. 10,455,453.

(Continued)

(51) Int. Cl.
*H04W 4/00* (2018.01)
*H04W 28/18* (2009.01)
(Continued)

(52) U.S. Cl.
CPC ............. *H04W 28/18* (2013.01); *H04L 65/00* (2013.01); *H04L 65/1006* (2013.01);
(Continued)

(58) Field of Classification Search
None
See application file for complete search history.

(56) References Cited

U.S. PATENT DOCUMENTS

| 8,428,032 B1 * | 4/2013 | Pankajakshan ... H04W 36/0022 370/331 |
| 9,288,337 B2 * | 3/2016 | Mohammed ............ H04W 8/10 |

(Continued)

FOREIGN PATENT DOCUMENTS

EP    2603040    6/2013

OTHER PUBLICATIONS

"3GPP TR 23.842 V2.0.0 (Dec. 2011) Technical Report", 3GPP Organizational Partners, Dec. 2011, pp. 1 and 11-42.

(Continued)

*Primary Examiner* — Gerald A Smarth
(74) *Attorney, Agent, or Firm* — Lee & Hayes, P.C.

(57) ABSTRACT

In some examples, an anchoring network system (e.g., PCSCF) of a telecommunications network can receive first data requesting a network service (e.g., eSRVCC) from a network terminal (e.g., UE). The anchoring system can determine that the network service is not supported in an access network to which the terminal is connected. The anchoring system can determine second data that does not request the predetermined network service, and transmit the second data to a core network system (e.g., SCSCF). In some examples, an application server can retrieve location information (e.g., LAC) of the terminal and determine that the service is not supported based on the location information. In some examples, an anchoring network system can remove a network-service system (e.g., ATCF or SCCAS) from a signaling chain associated with the terminal. In some examples, the terminal can determine whether SRVCC is supported based on an attach result.

20 Claims, 13 Drawing Sheets

Related U.S. Application Data

(60) Provisional application No. 62/546,407, filed on Aug. 16, 2017.

(51) Int. Cl.
  *H04W 48/02* (2009.01)
  *H04L 29/06* (2006.01)
  *H04W 48/18* (2009.01)
  *H04W 84/04* (2009.01)
  *H04W 80/10* (2009.01)
  *H04W 36/00* (2009.01)

(52) U.S. Cl.
  CPC ...... *H04L 65/1016* (2013.01); *H04L 65/1069* (2013.01); *H04L 65/1073* (2013.01); *H04W 48/02* (2013.01); *H04W 48/18* (2013.01); *H04W 36/0022* (2013.01); *H04W 80/10* (2013.01); *H04W 84/042* (2013.01)

(56) References Cited

U.S. PATENT DOCUMENTS

| | | | |
|---|---|---|---|
| 2009/0111428 A1* | 4/2009 | Blommaert | H04W 12/043 455/411 |
| 2009/0233583 A1* | 9/2009 | Weiner | G06Q 20/40 455/414.1 |
| 2010/0290436 A1* | 11/2010 | Wang | H04W 76/16 370/335 |
| 2012/0063430 A1* | 3/2012 | Suh | H04W 48/16 370/338 |
| 2012/0127960 A1* | 5/2012 | Lei | H04W 36/0022 370/332 |
| 2012/0213140 A1* | 8/2012 | Olsson | H04W 8/08 370/311 |
| 2013/0016698 A1* | 1/2013 | Keller | H04W 36/14 370/331 |
| 2013/0053027 A1* | 2/2013 | Lau | H04L 12/1485 455/432.1 |
| 2014/0051443 A1 | 2/2014 | Diachina et al. | |
| 2014/0198637 A1 | 7/2014 | Shan et al. | |
| 2014/0370842 A1* | 12/2014 | Abtin | H04W 4/90 455/404.2 |
| 2015/0016420 A1 | 1/2015 | Balabhadruni et al. | |
| 2015/0031355 A1 | 1/2015 | Leis et al. | |
| 2015/0078154 A1 | 3/2015 | Jain | |
| 2015/0207827 A1* | 7/2015 | Jheng | H04L 65/1046 370/260 |
| 2015/0230197 A1 | 8/2015 | Meng et al. | |
| 2016/0021579 A1 | 1/2016 | Mufti | |
| 2017/0064585 A1 | 3/2017 | Kim et al. | |
| 2017/0149850 A1* | 5/2017 | Lam | H04W 4/14 |
| 2017/0188270 A1 | 6/2017 | Shan et al. | |
| 2017/0245207 A1* | 8/2017 | Stammers | H04W 8/24 |
| 2017/0339740 A1 | 11/2017 | Abichandani et al. | |
| 2017/0366955 A1 | 12/2017 | Edge | |
| 2019/0059024 A1 | 2/2019 | Mufti et al. | |

OTHER PUBLICATIONS

"3GPP TS 23.272 V14.0.0", 3GPP Organizational Partners, Mar. 2017, section 5.2; and figure 5.2-1.

"3GPP TS 24.237 V14.4.0", 3GPP Organizational Partners, Jun. 2017, sections 6.2.2-6.2.3, 6.3.1-6.3.2, 6.5.1-6.5.2, 6A.3.1.

Camarillo, A, "The 3G IP multimedia subsystem (IMS): merging the Internet and the cellular worlds", Wiley & Sons, May 2006, pp. 148-152 and 155-158.

Do, M., "LTE: Tracking Area (TA) and Tracking Area Update (TAU)", retrieved Oct. 16, 2017 from <<https://www.netmanias.com/en/post/blog/5930/lte-tau/lte-tracking-area-ta-and-tracking-area-update-tau>>, Aug. 30, 2013, 2 pages.

"ETSI TS 123 003 v 13.5.0, Technical Specification", Apr. 2016, pp. 1, 24-25, 64-65, and 71.

"ETSI TS 123 237 v 12.8.0, Technical Specification", Jan. 2015, pp. 1, 22-43, 53-54, and 72-75.

"ETSI TS 123 272 v 14.1.0, Technical Specification", Oct. 2017, pp. 1, 3-6, and 18-21.

"ETSI TS 123 401 v 14.4.0, Technical Specification", Jul. 2017, pp. 1, 3-10, 115-130.

ETSI TS 124 008 v 13.5.0, Technical Specification, Apr. 2016, pp. 1, 395-398, 550, 558-562.

"ETSI TS 124 229 v 13.5.1, Techical Specification", May 2016, pp. 1, 368-370, 373-376.

"ETSI TS 124 301 v 14.4.0, Technical Specification", Jul. 2017, pp. 1, 30-32, 119-121, 281-284, and 353-354.

"ETSI TS 129 328 v 13.4.0, Technical Specification", Apr. 2016, pp. 1, 32-35.

ETSI TS 136 331 v 13.10, Technical Specification, Apr. 2016, pp. 1, 3-16, 64-66, 233-241, and 535.

"IMS Roaming and Interworking Guidelines", GSMA, IR.65, version 20.0, Jun. 7, 2016, pp. 1, 8-17 and 24-26.

"IMS Service Centralization and Continuity Guidelines", GSMA, IR.64, version 13.0, Feb. 2, 2016, pp. 1 and 5-13.

Koshimizu, T., "Improvement of VoLTE Domain HO with Operators Vision", NTT Docomo, Inc., Mar. 6, 2012, pp. 1 and 6-9.

Office action for U.S. Appl. No. 15/858,517, dated Mar. 7, 2019, Mufti, "Service Enablement Based on Access Network ", 10 pages.

PCT Search Report and Written Opinion dated Nov. 11, 2018 for PCT Application No. PCT/US18/43505, 9 pages.

Rosenberg, et al., "Indicating User Agent Capabilities in the Session Initiation Protocol (SIP)", RFC 3840 (Standards Track, Aug. 2004, pp. 1-5 and 7-10.

Holmberg, et al., "Mechanism to Indicate Support of Features and Capabilities in the Session Initiation Protocol (SIP)", RFC 6809 (Standards Track), Nov. 2012, pp. 1-5, 7-9 and 11.

"S8HR—Faster Path to VoLTE Roaming but not Without Challenges", iBasis retrieved Oct. 30, 2017 from <<http://ibasis.com/blog/s8hr-faster-path-to-volte-roaming-but-not-without-challenges/>>, 4 pages.

"T-Mobile Network Bands and Technologies", T-Mobile Support, retrieved Oct. 31, 2017 from <<https://support.t-mobile.com/docs/Doc-4988>>, 5 pages.

Rosenberg, et al., "SIP: Session Initiation Protocol", RFC 3261 (Standards Track), Jun. 2002, pp. 1, 8-10, and 28-29.

The European Search Report and Written Opinion dated Nov. 13, 2020 for European Patent Application No. 18846978.7, 11 pages.

\* cited by examiner

SERVICE ENABLEMENT BASED ON ACCESS NETWORK

CROSS-REFERENCE TO RELATED APPLICATIONS

This application is a continuation of and claims priority to U.S. application Ser. No. 15/858,517, filed on Dec. 29, 2017 and entitled "Service Enablement Based on Access Network," which is a non-provisional of and claims to U.S. Provisional Application No. 62/546,407, filed Aug. 16, 2017 and entitled "AD HOC ATCF SELECTION", the entirety of which are incorporated herein by reference.

BACKGROUND

Many computing devices configured for telecommunications ("terminals"), such as smartphones, are capable of communicating via various types of networks. For example, cellular and other portable terminals may connect with circuit-switched (CS) networks such as the Global System for Mobile Communications (GSM) or packet-switched (PS) networks such as Long Term Evolution (LTE). Within a communication session or between communication sessions, a terminal may leave the coverage area of one cellular base station (e., LTE eNodeB) and enter the coverage area of another base station. Those base stations may communicate using the same technology or band, or different technologies or bands. For example, single-radio voice call continuity (SRVCC) permits handover of established communication sessions from PS networks to CS networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For brevity of illustration, in the diagrams herein, an arrow beginning with a diamond connects a first component or operation (at the diamond end) to at least one second component or operation that is or can be included in the first component or operation in at least one example.

DETAILED DESCRIPTION

Overview

Figure 1:
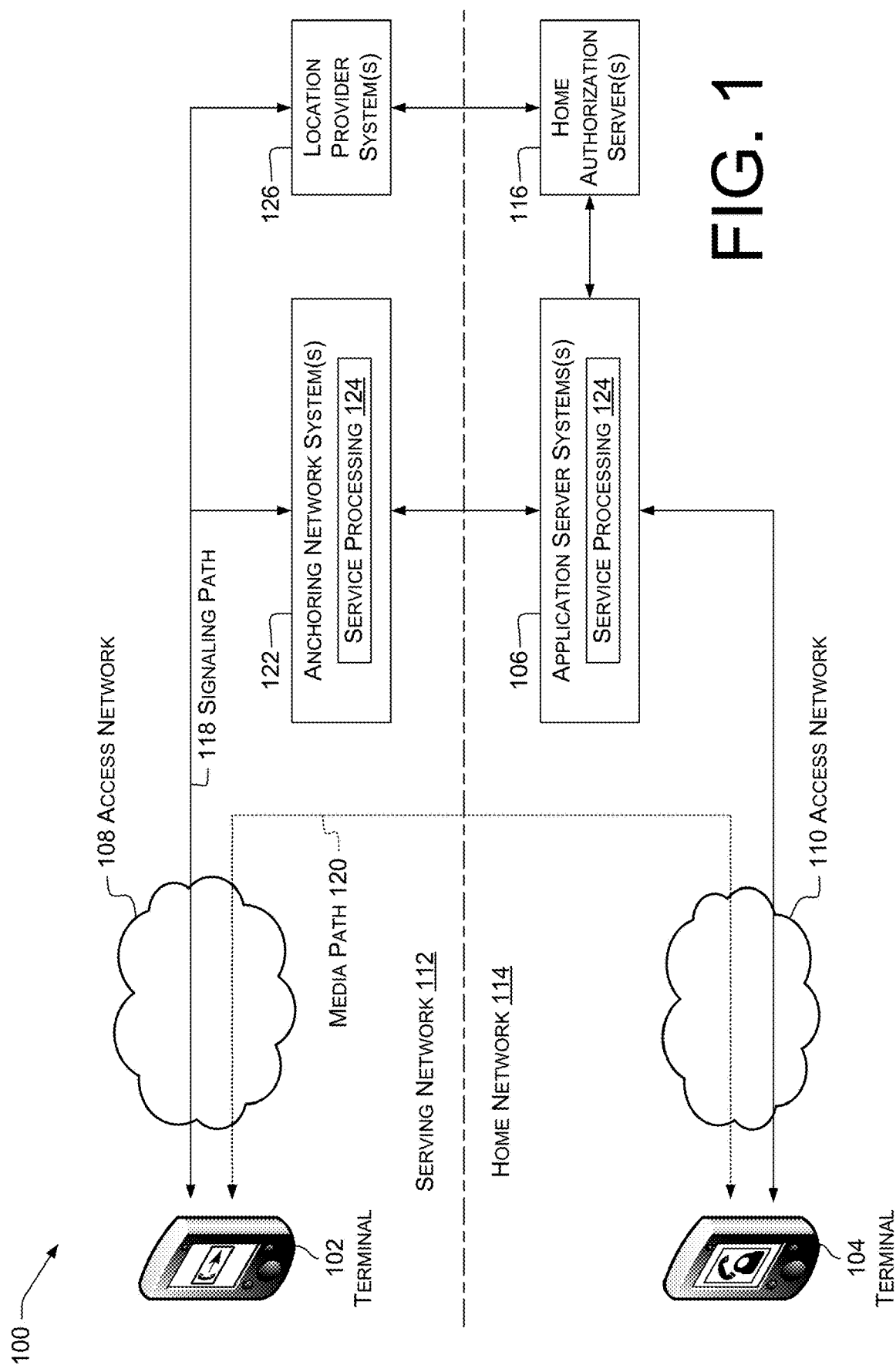
FIG. 1 is a block diagram illustrating a system for implementing network service access control, e.g., based on terminal location information, according to some implementations.

Some example systems and techniques described herein permit reducing resource consumption or increasing call capacity within a core network. Some examples control the availability of SRVCC or similar services based on location information of a terminal. For example, service availability can be controlled based on the network bands and technologies available to the terminal in a particular area.

Some prior networks support SRVCC handover from PS to CS for all terminals. This uses resources on the P-CSCF, and Service Centralization and Continuity Application Server (SCCAS) (or telephony application server, TAS) in those networks, and additionally on the access transfer control function (ATCF) if evolved SRVCC (eSRVCC) is supported. However, terminals in areas without CS coverage, e.g., LTE-only cells, will by definition never handover to CS. Therefore, the resources used to support SRVCC for those terminals are wasted. In some embodiments, therefore, SRVCC is enabled or disabled for particular terminals depending on the Tracking Area Code or other information indicating whether the terminal is within range of CS coverage.

An alternative would be to deploy a separate non-SRVCC network. For example, an operator could deploy a first set of eNodeBs, MMEs, SBGs, and other devices, interconnecting cells in which both PS and CS are available. The operator could deploy a second set of network devices interconnecting cells in which only PS is available. However, this duplication of devices would require substantial investment in new hardware. Moreover, this substantially increase the amount of traffic on the interconnects between the first and second sets.

As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals.

The term "session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session.

Example networks carrying sessions include second-generation (2G) cellular networks such as GSM and third-generation (3G) cellular networks such as the Universal Mobile Telecommunications System (UMTS). Other example networks include fourth-generation (4G) cellular networks, such as LTE cellular networks carrying voice over LTE (VoLTE) sessions using Session Initiation Protocol (SIP) signaling, the public switched telephone network (PSTN) using Signaling System 7 (SS7) signaling, and data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport. GSM and the PSTN are examples of CS networks; LTE and WIFI are examples of PS networks.

A terminal in a mobile-radio system, e.g., an association of public land mobile networks (PLMNs), is associated with a home network that maintains authorization information for that terminal. A terminal can receive communication services from the home network (e.g., a home PLMN, HPLMN) or from a visited network (e.g., a visited PLMN, VPLMN) different from the home network. The term "roaming" describes operation of a terminal in a visited network. A "serving network" is an access network via which a terminal is receiving connectivity, regardless of whether that network is a home network or a visited network. Evolved SRVCC (eSRVCC) technology permits signaling and media to be anchored at an ATCF and an access transfer gateway (ATGW), respectively, of a serving network. The serving network can therefore isolate the home network from routing changes due to handover from PS to CS. This can reduce handover latency and increase performance.

However, eSRVCC requires maintaining state data specific to eSRVCC on the ATCF, and both eSRVCC and conventional SRVCC also require maintaining SRVCC state date on a SCCAS of the home network. In a simulated example, supporting SRVCC reduced the number of concurrently-registered subscribers by 4% at the ATCF, and by 30% at the SCCAS, compared to a simulation in which SRVCC is not supported. In some prior schemes, SRVCC overhead is incurred even if SRVCC will never be used by a particular terminal. For example, a serving network that deploys only PS coverage in a particular band will not conduct SRVCC of terminals using that band. Similarly, SRVCC cannot be performed if the MSC of a VPLMN cannot access the ATCF of an HPLMN. In another example, some S8 home-routed (S8HR) configurations do not support eSRVCC. Therefore, maintaining the state data for eSRVCC of terminals attached to networks having those characteristics reduces network capacity without providing a benefit.

In some examples, an anchoring network system (e.g., a PCSCF) of a telecommunications network can receive first data requesting a network service (e.g., eSRVCC) from a network terminal (e.g., a UE). The anchoring system can determine that the network service is not supported in an access network to which the terminal is connected. The anchoring system can determine second data that does not request the predetermined network service, and transmit the second data to a core network system (e.g., a SCSCF). For example, the anchoring system can remove a Feature-Caps header requesting SRVCC from of a SIP REGISTER or INVITE request. In some examples, an application server (AS) can retrieve location information (e.g., a location area code, LAC) of the terminal and determine that the service is not supported based on the location information. For example, the AS can look up at least part of the location information in a database of supported service areas. In some examples, an anchoring network system can remove a network-service system (e.g., ATCF or SCCAS) from a signaling chain associated with the terminal. In some examples, the terminal can determine whether SRVCC is supported based on an attach result.

These and other examples herein can reduce the overhead of SRVCC by not storing SRVCC state data for terminals that presently cannot participate in SRVCC handovers. This can reduce network load and increase availability of network services. This can also permit supporting a higher number of concurrent sessions at a given quality of service (QoS). Some examples enable and disable SRVCC or eSRVCC per-terminal or per-registration, permitting a terminal to use SRVCC whenever it is available without requiring resource reservations when it is not available. Throughout this document, unless otherwise indicated, reference to "SRVCC" include SRVCC as originally specified, eSRVCC, aSRVCC, and other variants of SRVCC.

Illustrative Configurations

FIG. 1 is a block diagram illustrating a telecommunication system 100, e.g., a telecommunications network, according to some examples. The system includes terminals 102 and 104, e.g., user equipment or other mobile phones, or other computing or communications devices. The terminals 102 and 104 can be operated, e.g., by respective users. The terminals 102 and 104 are communicatively connected to one or more application server system(s) 106, e.g., via respective access networks 108 and 110, e.g., LTE networks. The application server system(s) 106 can include, e.g., a TAS or SCCAS of an Internet Protocol (IP) Multimedia Subsystem (IMS) in a VoLTE-capable network. The application server system(s) 106 can be implemented as standalone device(s), or combined with other network functions into a single device or collection of device(s).

The terminals 102 and 104 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 and 104 as being "mobile," (i.e., configured to be carried and moved around) it is to be appreciated that the terminals 102 and 104 may represent various types of communication devices that are generally stationary as well, such as televisions, desktop computers, game consoles, set top boxes, Internet of Things (IoT) devices such as fixed sensors that communicate via IP-based wireless networks, and the like. For example, IoT devices can transmit data via the network, e.g., 2-4 times per hour. Other IoT devices can include IoT network interface chips embedded in small electronic devices, appliances, or other devices; smart tags on boxes or other containers of medicine or other goods; or in-vehicle telemetry systems. In this sense, the terms "communication device," "wireless device," "wireline device," "mobile device," "computing device," "user equipment," and "UE" may be used interchangeably herein to describe any communication device capable of performing the techniques described herein. Terminals 102 and 104, e.g., user equipment, can include user cellular equipment or other telecommunications or computing devices communicatively connectable with other computing devices via one or more application server system(s) 106. Mobile phones and copper-loop landline phones can be examples of user equipment.

Furthermore, the terminals 102 and 104 may be capable of communicating over wired networks, and/or wirelessly using any suitable wireless communications/data technology, protocol, or standard, such as GSM, Time Division Multiple Access (TDMA), UMTS, Evolution-Data Optimized (EVDO), LTE, Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, Voice over LTE (VoLTE), IEEE 802.1x protocols, wireless microwave access (WIMAX), Wi-Fi, and/or any future IP-based network technology or evolution of an existing IP-based network technology.

In the illustrated example, terminal 102 is roaming in, or otherwise connected to, a serving network 112 having the access network 108. The serving network 112 can include a VPLMN. In some examples, serving network 112 can be or include an Evolved Packet System (EPS) network including Evolved UMTS Terrestrial Radio Access Network (E-UTRAN) access and an Evolved Packet Core (EPC).

In some examples, terminal 102 uses services located in, part of, or otherwise provided by, a home network 114. The home network 114 can include an HPLMN. In some examples, terminal 102 is configured so that any network other than home network 114 is a serving network such as serving network 112. In this example, terminal 104 is shown as attached to home network 114 for brevity, but this is not limiting. For example, terminal 104 can be roaming in serving network 112 or another network, or have a different home network and this be roaming in home network 114.

Figure 2:
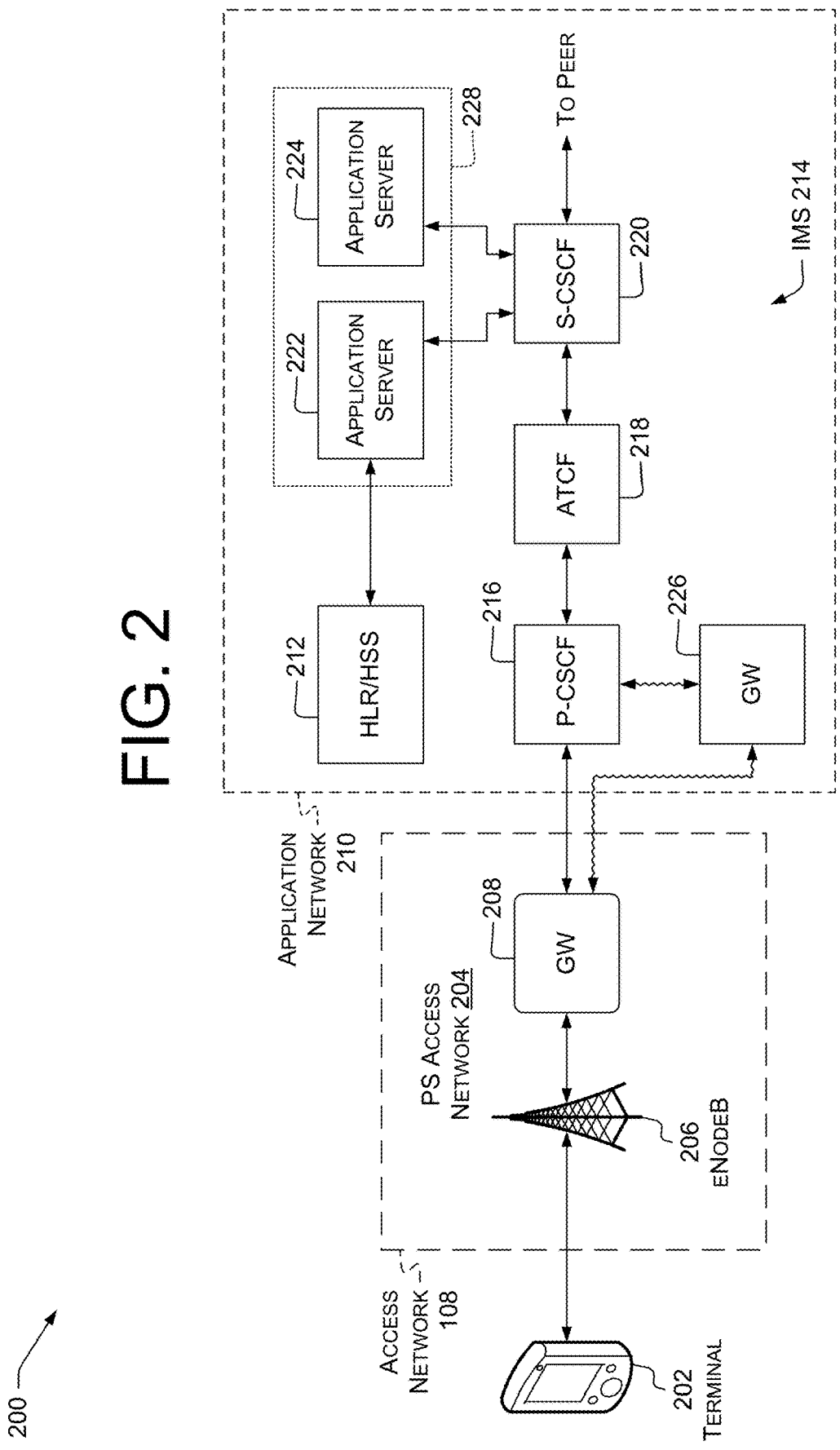
FIG. 2 illustrates an example telecommunications network, including components used to perform service-access control of a communication session.

In some examples, at least one of serving network 112 or home network 114 can include a PS access network, e.g., as discussed herein with reference to FIG. 2. Additionally or alternatively, at least one of serving network 112 or home network 114 can include a local-area network (LAN)-based access network having a wireless access point (WAP), e.g., a WIFI WAP, and a bridge or other packet relay. Additionally or alternatively, at least one of serving network 112 or home network 114 can include a CS access network having a CS base station and a mobile switching center (MSC) server (MSS).

In some examples, home authorization server system system(s) 116 in home network 114 hold information associated with terminal 102 or other terminals of home network 114. Home authorization server system system(s) 116 can be implemented as standalone device(s), or combined with other network functions into a single device or collection of device(s)/Home authorization server system system(s) 116 can include, e.g., a Diameter Routing Agent (DRA), a home location register (HLR), or a home subscriber server (HSS). Home authorization server system system(s) 116 can include information used in determining whether terminal 102 is permitted to attach to serving network 112 and, if so, what service(s) terminal 102 is permitted to use. Home authorization server system system(s) 116 can additionally or alternatively store information about current or prior registrations or attaches of terminal 102 to access network 108 or components of home network 114 (e.g., an IMS, discussed below).

Once terminal 102 is authorized by home authorization server system system(s) 116 and attached to serving network 112, terminal 102 can participate in sessions. For example, terminal 102 can initiate a session with terminal 104 by exchanging messages via a signaling path 118. For example, terminal 102 can transmit a SIP INVITE message having a Session Description Protocol (SDP) body including a session description, or other session-initiation message. In some examples, the session-initiation message is not associated with a handover. Application server system(s) 106 or terminal 104 can, in response, transmit corresponding SIP response(s), e.g., a SIP 180 Ringing or 200 OK response.

Session initiation can be performed, e.g., as defined in the GSM or VoLTE standards, and can include the exchange of additional messages (not shown) between the terminals 102 and 104 and the application server system(s) 106. Data of the session, such as audio data or video data, can be exchanged between terminals 102 and 104 via a media path 120. In some examples, media path 120 can pass through or involve one or more access or media gateway(s), omitted for brevity. Gateway(s) can be located in serving network 112 or home network 114, in any combination.

In some examples, messages along signaling path 118 can pass through anchoring network system(s) 122, e.g., a P-CSCF or an ATCF of an IMS. Anchoring network system(s) 122 can be implemented as standalone device(s), or combined with other network functions into a single device or collection of device(s). As used herein, an "anchoring network system" is a network function, embodied in a network device, through which at least some signaling traffic for a communication session, e.g., SIP traffic, passes for the duration of an established phase of the communication session. That session is "anchored" at the anchoring network device. Anchoring signaling traffic for a session can increase network robustness by isolating the two sides of the anchoring network device. For example, terminal 102 is not required to change its SIP (or other signaling) route to terminal 104 when terminal 104 is handed over from access network 110 to another access network, since that SIP route between terminals 102 and 104 passes through anchoring network system 122. In some examples, anchoring takes place in response to receipt by anchoring network system 122 of a SIP INVITE request, and the anchoring network system 122 transmits a SIP 183 Session in Progress response once anchoring is complete, e.g., once anchoring network system 122 has recorded an indication that the communication session is anchored at that anchoring network system 122. As used herein, a SIP response code ending in "xx", e.g., a SIP 1xx Provisional response, signifies any response of, e.g., class 1 of SIP responses (RFC 3261, § 7.2).

In some examples, e.g., as discussed herein with reference to FIGS. 2-11, application server system(s) 106 or anchoring network system(s) 122 perform service processing 124. For example, terminal 102 may request a service, e.g., SRVCC, that is not supported in access network 108. The request can be included, e.g., in an INVITE or other message. Service processing 124 can include removing the request for that service before forwarding the message to other components of networks 112, 114.

As used herein, a message "transmitted to" or "transmitted toward" a destination, or similar terms, can be transmitted directly to the destination, or can be transmitted via one or more intermediate network devices to the destination. Those intermediate network devices can include anchoring network system(s) 122 or application server system(s) 106. Similarly, a message "received from" a destination can be received directly from the destination, or can be received via one or more intermediate network devices from the destination. A message passing through one or more intermediate network devices can be modified by those network devices, e.g., by adding or removing framing, or by changing a presentation of at least part of the message, e.g., from a SIP start-line to a SIP header or vice versa.

In some examples, access to services is contingent on the physical or network location of terminal 102. Terminal 102 or home authorization server system system(s) 116 can retrieve location information from one or more location provider system(s) 126, which can be implemented as stand-alone device(s), or combined with other network functions into a single device or collection of device(s). The location provider system(s) 126 can include, e.g., a Location Retrieval Function (LRF), Location Server (LS), or other server providing data of a position of, or providing location information associated with, a terminal 102, 104. Terminal 102, home authorization server system system(s) 116, or other devices can communicate with location provider system(s) 126, e.g., via the SIP or Diameter protocols or other protocols, e.g., over the LTE Sh interface or other appropriate interfaces.

As used herein, "location information" is any information used or useful in determining position of terminal 102 with respect to the coverage area of a particular service. For example, location information can include a flag indicating whether or not terminal 102 is within the coverage area. Location information can include position information, e.g., an address or a set of coordinates. For example, terminal 102 can determine its position via GPS, and provide coordinates of the determined position as or in location information, e.g., included in a SIP REGISTER request. Additionally or alternatively, location information can include information that can be used in determining or estimating position. For example, location information can include an EUTRAN Cell Global Identification (ECGI) of an eNodeB to which terminal 102 is, or has recently been, connected. Since an eNodeB has a limited spatial range, an ECGI indicates an area (eNodeB coverage area) in which the terminal 102 is (or recently was) positioned. Location information can similarly include a cell-tower identifier or other logical identifier that can be correlated with position. Location information can additionally or alternatively include an MCC, MNC, country code, or other identifying information described herein.

In some examples, the application server system(s) 106 can be entirely in serving network 112, entirely in home network 114, or at least one in each network 112, 114. In some examples, media gateway(s) can be entirely in serving network 112, entirely in home network 114, or at least one in each network 112, 114. In some examples, each of the application server system(s) 106 and media gateway(s) belongs to either the serving network 112 or the home network 114.

Various examples herein permit controlling resource usage by enabling services only for terminals on networks that support those services. Various examples herein permit controlling service access based on, e.g., serving network, tracking area, and device type (or any combination of any of those).

FIG. 2 illustrates an example telecommunications network 200. The illustrated blocks represent network functions that can be implemented as standalone device(s), or combined with other network functions into a single device or collection of device(s). The devices and networks illustrated in FIG. 2 can be examples of the devices and networks illustrated in FIG. 1 and described above. Accordingly, the descriptions of the devices and networks of FIG. 1 apply to the devices and networks of FIG. 2.

Terminal 202, which can represent terminal 102 or 104, is attached to access network 108 of the telecommunications network 200. In the example of FIG. 2, access network 108 includes a PS access network 204, e.g., an EPS. Access network 108 can additionally or alternatively include a CS access network or a LAN access network, e.g., a WIFI access network. Each access network can be configured to selectively carry a communication session of terminal 202.

In the illustrated example, the PS access network 204 of serving network 112, e.g., an LTE access network, includes an eNodeB 206, e.g., a 4G base station or other access point, that provides connectivity to the PS access network 204. The eNodeB 206 is connected with a gateway 208 ("GW"), e.g., an LTE S-GW or P-GW.

Access network 108 is communicatively connected with an application network 210, e.g., an IMS network or other network providing services to terminal 202. Application network 210 includes an HLR/HSS 212, which can be among, or otherwise represent, home authorization server system(s) 116. Other examples of home authorization server system(s) 116 can include, e.g., an equipment identity register (EIR), an enhanced EIR (EEIR), a DNS server, or an E.164 Number Mapping (ENUM) server.

Application network 210 can also include an IMS 214. IMS 214 can provide media-handling services to terminal 202, e.g., to route video or voice data or to maintain continuity of a communication session during handover of the communication session. IMS 214 can include a number of nodes, such as a proxy call session control function (P-CSCF) 216, an ATCF 218, a serving call session control function (S-CSCF) 220, and one or more application server(s) (ASes) 222, 224, e.g., a TAS and an SCCAS, respectively. ASes 222, 224 can represent application server system(s) 106. IMS 214 can additionally or alternatively include other components, e.g., additional ASes. For brevity, media path 120 and components thereon are not represented in FIG. 2.

In some examples (e.g., S8HR), application network 210 includes a home gateway 226, e.g., a P-GW. In some of these examples, as indicated by the wavy arrows, communications between gateway 208 and P-CSCF 216 (or other components of application network 210) pass through home gateway 226 instead of proceeding directly between gateway 208 and P-CSCF 216. In some examples using home gateway 226, gateway 208 in the serving network 112 can be an S-GW. In some examples, terminal 202 can access multiple network services, each having its own home gateway 226 (e.g., P-GW). In some examples, gateway 208 can be or include at least one of an S-GW, a P-GW, an Interconnection Border Control Function (IBCF), a Transition Gateway (TrGW), a media gateway (MGW), or another gateway or gateway(s) between serving network 112 and application network 210. In some examples, gateway 208 is a P-GW and gateway 226 is a policy control rules function (PCRF) node between the P-GW and the P-CSCF 216.

In an example of the LTE S8-interface home-routed (S8HR) configuration, terminal 102 communicates via an S-GW with an MME. The MME then communicates with an HSS (home authorization server system 116) and establishes General Packet Radio Service (GPRS) Tunneling Protocol (GTP) tunnel(s) through the S-GW to an LTE packet data network (PDN) gateway (P-GW) of home network 114, or to other application server system(s) 106. The tunnels can alternatively be Proxy Mobile IPv6 (PMIPv6) tunnels. The tunnels can include an association between an access gateway and an application server system 106 or other network device that permits terminal 102 to communicate with that application server system 106. Terminal 102 can then receive network services from application server system 106 via the tunnel. Additionally or alternatively, the tunnel can permit communication between terminal 102 and a gateway device such as a P-GW.

In an example of session-control services, a SIP signaling path of a communication session can through eNodeB 206, gateway 208, P-CSCF 216, ATCF 218, S-CSCF 220, AS 222 (e.g., TAS) and AS 224 (e.g., SCCAS), in that order. After AS 224, the example SIP signaling path passes back through S-CSCF 220 to a peer (not shown). In an example in which terminal 202 is an originating terminal (MO UE), the peer can be, e.g., an S-CSCF corresponding to a terminating terminal (MT UE, omitted for brevity). In the illustrated example, the ASes 222 and 224 are anchoring network devices and proxy signaling traffic for the communication session, e.g., operating as SIP proxies or back-to-back user agents (B2BUAs).

The telecommunications network 200 may also include a number of devices or nodes not illustrated in FIG. 2. Such devices or nodes may include an ATGW, a visitor location register (VLR), a serving GPRS support node (SGSN), a gateway GPRS support node (GGSN), a policy control rules function (PCRF) node, or a session border controller (SBC). IMS 214 may further include a number of devices or nodes not illustrated in FIG. 2, such as a presence server and one or more additional CSCFs. A core network of the telecommunications network 200 may be a GPRS core network or an EPC network, or may include elements from both types of core networks. Access network 108 or application network 210 can additionally or alternatively support different data flows than those depicted. For example, ATCF 218 can look up the address of AS 224 in the DNS, e.g., during SRVCC, then communicate with AS 224 directly instead of via S-CSCF 220.

The telecommunications network 200 may provide a variety of services to terminal 202, such as synchronous communication routing across a PSTN. Further services may include call control, switching, authentication, billing, etc. In at least one example, IMS 214 functions and devices communicate using specific services provided by the serving network 112 or elements thereof, but are not directly tied to those specific services. For example, IMS 214 devices can intercommunicate using an EPC network, a GSM network, a SONET network, or an Ethernet network.

Some examples herein, e.g., in FIG. 2, and in FIGS. 7 and 8, below, are given in the context of an originating (MO) terminal. However, this is not limiting. Corresponding techniques and structures can additionally or alternatively be used with terminating (MT) terminals. In some examples of SRVCC, the P-CSCF is between the ATCF and the terminal on both the originating and terminating sides. In some examples, the TAS is between the SCCAS and the terminal on both the originating and terminating sides. In some examples, the ATCF is between the P-CSCF and the terminal on both the originating and terminating sides. In some examples, the SCCAS is between the TAS and the terminal on both the originating and terminating sides. In some examples, the SCCAS and the TAS are functions implemented in a single server or node, depicted as node 228.

Figure 3:
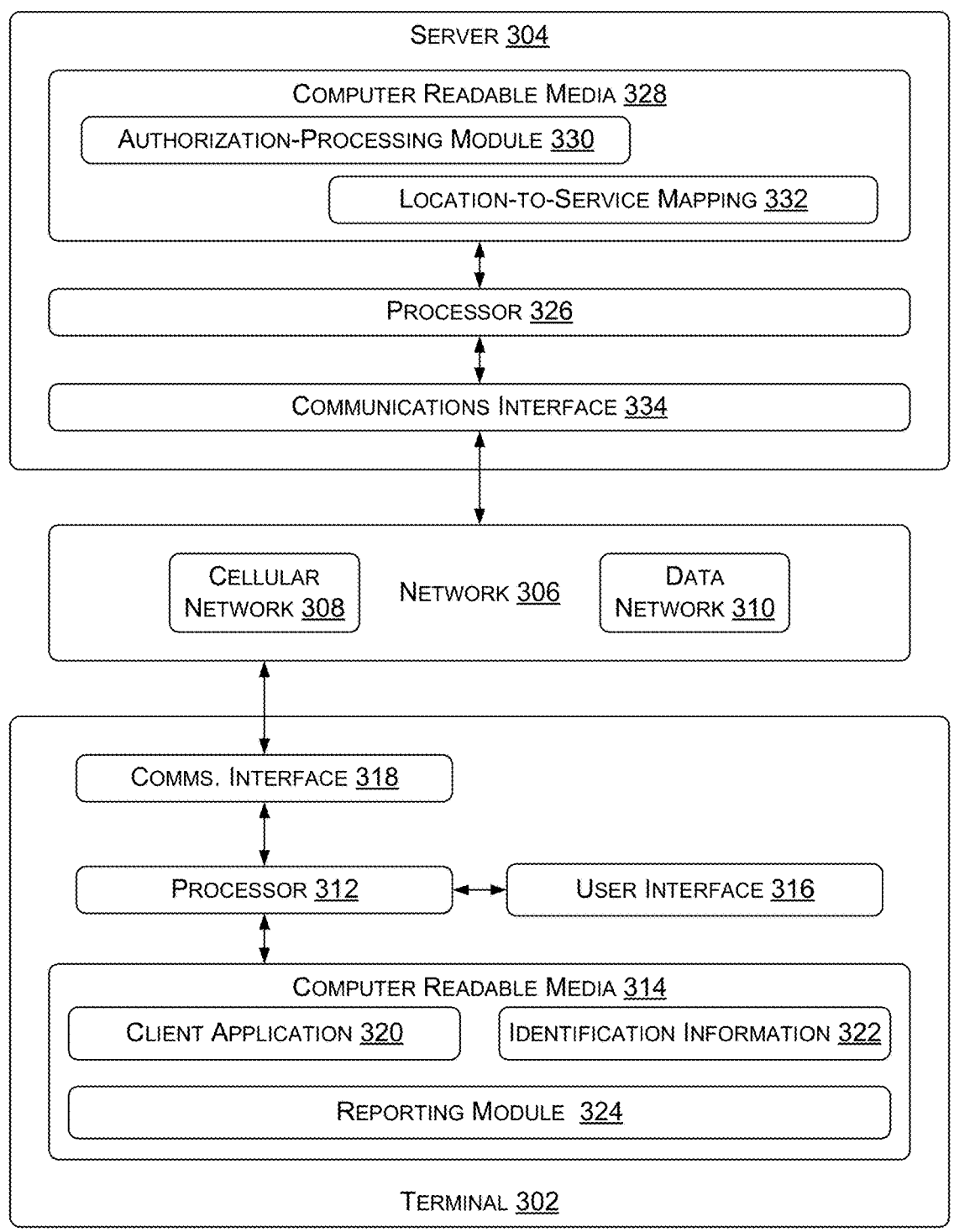
FIG. 3 is a block diagram illustrating a system that provides service-access control according to some implementations.

FIG. 3 is a block diagram illustrating a system 300 permitting service processing with respect to terminals, e.g., roaming terminals, according to some implementations. The system 300 includes a terminal 302, e.g., a wireless phone or other terminal such as terminal 102 or 104, FIG. 1, or terminal 202, FIG. 2, coupled to a server 304 via a network 306. The server 304 can represent an application server system 106 (e.g., AS 222 or 224), an anchoring network system 122, or another control system of a telecommunications network configured to perform functions described herein.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Service access control as described herein can be performed, e.g., for services provided via 2G, 3G, 4G, WIFI, or other networks. Service access control can be performed with respect to any party known to the network, e.g., any party registered in an IMS or having an IMSI or IMEI.

The cellular network 308 can provide wide-area wireless coverage using a technology such as GSM or LTE, or other wireless network types described above with reference to FIG. 1. Communications between the server 304 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("Bluetooth"), Asynchronous Transfer Mode (ATM), WIMAX, and other network technologies, e.g., configured to transport IP packets. In some examples, the server 304 includes or is communicatively connected with an interworking function (IWF) or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using High Speed Packet Access (HSPA), LTE, or other technologies as well as voice traffic. Some cellular networks 308 carry both data and voice in a PS format. For example, many LTE networks carry voice traffic in data packets according to the voice-over-LTE (VoLTE) standard. Various examples herein provide origination and termination of, e.g., carrier-grade voice calls on, e.g., networks 306 using CS transports or mixed VoLTE/3G transports, or on terminals 302 including original equipment manufacturer (OEM) handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The terminal 302 can further include a user interface (UI) 316, e.g., including an electronic display device, a speaker, a vibration unit, a touchscreen, or other devices for presenting information to a user and receiving commands from the user. The terminal 302 can further include one or more communications interface(s) 318, e.g., radio(s) or other network interface(s), configured to selectively communicate (wired or wirelessly) via the network 306, e.g., via an access network 108 or 110.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program modules, or other data.

The CRM 314 can include processor-executable instructions of a client application 320. The client application 320, e.g., a native or other dialer, can permit a user to originate and terminate communication sessions associated with the terminal 302, e.g., a wireless phone. The client application 320 can additionally or alternatively include an SMS, RCS, or presence client, or a client of another telephony service offered by the server 304.

The CRM 314 can store identification information 322 identifying the terminal 302. The identification information 322 can include, e.g., an IMEI, an IMSI identifying the subscriber using terminal 302, or other information discussed herein, e.g., with reference to block 1102. The CRM 314 can additionally or alternatively store credentials (omitted for brevity) used for access, e.g., to IMS or RCS services.

The CRM 314 can include processor-executable instructions of a reporting module 324. The reporting module can determine whether SRVCC is supported and report that information to an anchoring network system 122 or application server system 106. In some examples, terminal 302 can be configured to, e.g., by executing the processor-executable instructions of reporting module 324, perform functions described herein with reference to with reference to FIG. 7 or 12.

The server 304 can include one or more processors 326 and one or more CRM 328. The CRM 328 can be used to store processor-executable instructions of an authorization-processing module 330. The processor-executable instructions of module 330 can be executed by the one or more processors 326 to perform various functions described herein, e.g., service processing 124. In some examples, server 304 can be configured to, e.g., by executing the processor-executable instructions, perform functions described herein with reference to FIGS. 4-11.

In some examples, CRM 328 can store a location-to-service mapping 332, e.g., a database or other key-value store. Mapping 332 can indicate, for particular location identifiers or other location information, whether predetermined network service(s) are supported in the corresponding locations. In an example, mapping 332 can indicate whether SRVCC is supported on a cell-by-cell basis. An example of mapping 332 is described herein with reference to block 604.

In some examples, server 304 can communicate with (e.g., is communicatively connectable with) terminal 302 or other devices via one or more communications interface(s) 334, e.g., network transceivers for wired or wireless networks, or memory interfaces. Example communications interface(s) 334 can include ETHERNET or FIBRE CHANNEL transceivers, WIFI radios, or DDR memory-bus controllers (e.g., for DMA transfers to a network card installed in a physical server 304). Communications interface(s) 318 can include any of the components described in this paragraph.

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 326 with, if required, CRM 328.

Illustrative Operations

Figure 4:
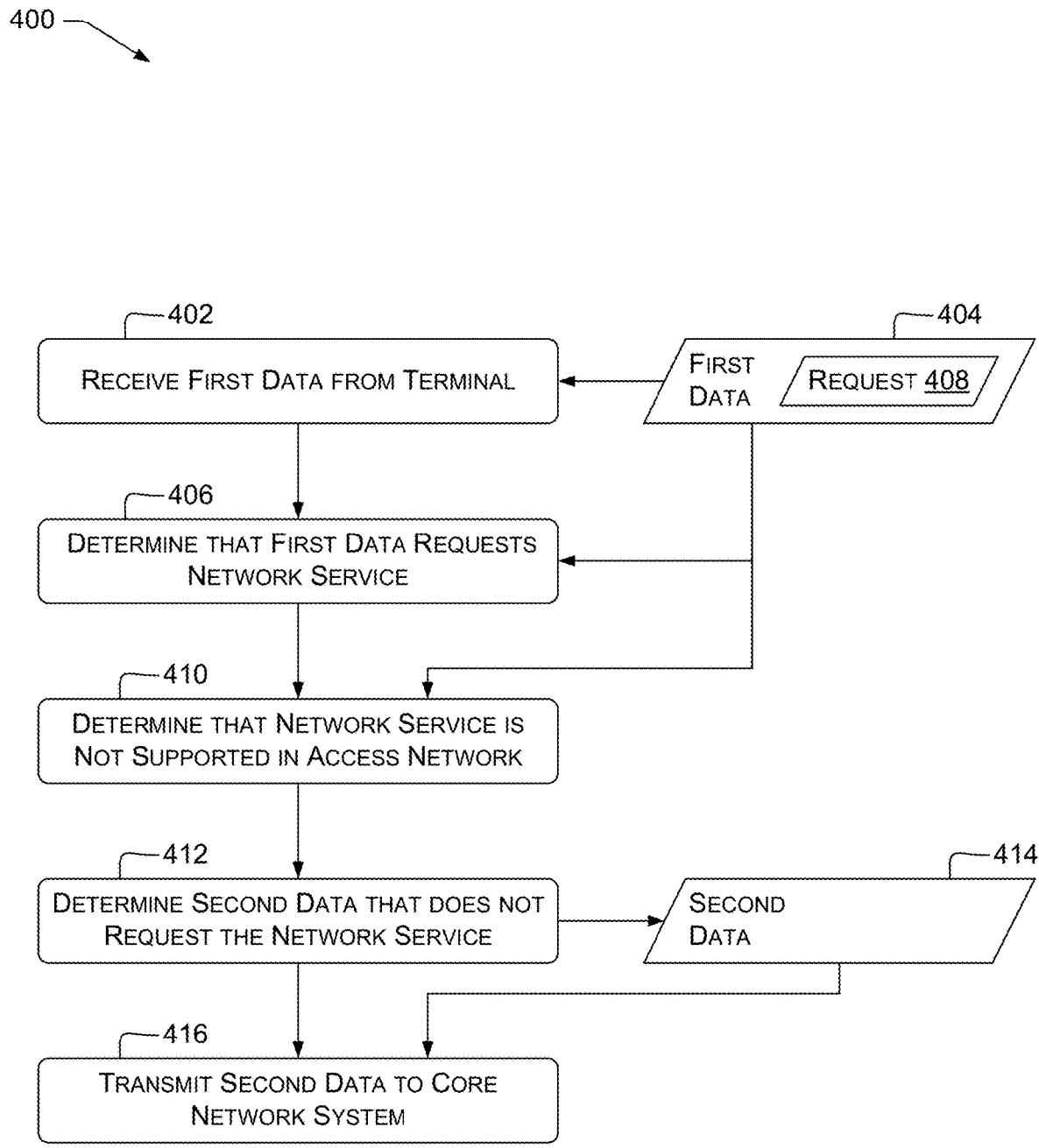
FIG. 4 illustrates an example process for disabling a network service, with respect to a terminal in a particular access network, according to some implementations.

FIG. 4 is a dataflow diagram illustrating an example process 400 for controlling access to network services, and related data items. Process 400 can be performed, e.g., by an anchoring network system 122 of a telecommunications network, e.g., a P-CSCF or other server 304. The anchoring network system 122 can communicate with user equipment, e.g., terminal 102, 202, or 302, of telecommunications network 306. In some examples, the anchoring network system 122 includes one or more processors (e.g., processor 326) configured to perform operations described below, e.g., in response to computer program instructions of the authorization-processing module 330.

Operations shown in FIG. 4 and in FIGS. 5, 6, and 9-12, discussed below, can be performed in any order except when otherwise specified, or when data from an earlier step is used in a later step. For clarity of explanation, reference is herein made to various components shown in FIGS. 1-3 and 8 that can carry out or participate in the steps of the exemplary method, and to various operations and messages shown in FIG. 7 that can occur while the exemplary method is carried out or as part of the exemplary method. It should be noted, however, that other components can be used; that is, exemplary method(s) shown in FIGS. 4-6 and 9-12 are not limited to being carried out by the identified components, and are not limited to including the identified operations or messages.

At 402, in some examples, the server 304, e.g., the processor 326, receives first data 404 from a terminal of the telecommunications network via a communications interface;

At 406, in some examples, the server 304 can determine that the first data 404 includes a request 408 for a predetermined network service. For example, the predetermined network service can be SRVCC or another continuity service, e.g., for continuity of data sessions across handover. The predetermined network service can be identified by, e.g., an APN, an APN network identifier (NI), or a port number. In some examples, the predetermined network service comprises a PS media service. For example, the PS media service can include VoLTE.

At 410, in some examples, server 304 can determine that the predetermined network service is not supported in an access network to which the terminal is connected. Various examples of block 410 are described herein with reference to FIGS. 6 and 9. In some example, server 304 can test field values in a P-Access-Network-Info (PANI) header, or a lookup table, to determine whether the service is supported. In some examples, if the predetermined network service is supported, server 304 can forward the first data 404 to the core network device with request 408, and process 400 can terminate (for brevity, those operations are not depicted).

At 412, in some examples, server 304 can determine second data 414 that does not request the predetermined network service. Various examples of block 412 are described herein with reference to FIGS. 7-10. In some examples, server 304 can remove values from a SIP Feature-Caps (RFC 6809) header, or remove feature parameters from a SIP Contact header (RFC 3840).

In some examples, the first data 404 comprises a first SIP Feature-Caps header. The request for the predetermined network service comprises a capability value in the first Feature-Caps header, e.g., g.3gpp.atcf. Block 412 can include determining, as the second data 414, a SIP request that either: comprises a second Feature-Caps header that does not include the capability value; or does not include a Feature-Caps header. In either situation, a core network system receiving the second data 414 (block 416, below) (e.g., an ATCF) can determine, based on the Feature-Caps header (or absence thereof) that the predetermined network service (e.g., SRVCC) is not requested. The core network system can then take appropriate action to disable or not enable the service. This can save resources that would otherwise be used by or for the service.

In some examples, the second data 414 includes Session Initiation Protocol (SIP) registration request (e.g., a REGISTER request) addressed to the core network system. For example, an anchoring network system 122 including a P-CSCF can transmit a re-REGISTER to clear previously-recorded signaling routes (Record-Route stacks) through the ATCF and establish a new stack that bypasses the ATCF.

At 416, in some examples, server 304 can transmit the second data 414 to a core network system via the communications interface. The core network system can be, e.g., an ATCF or S-CSCF. In some example, server 304 can transmit the second data 414 instead of the first data 404.

In some examples, the anchoring network system 122 can include an Access Transfer Control Function (ATCF) and the core network system can include a Serving Call Session Control Function (S-CSCF). The ATCF can refrain from adding itself to the SIP signaling chain if SRVCC is not supported. Specifically, in some examples, the first data 404 can include a first Session Initiation Protocol (SIP) request, e.g., REGISTER or INVITE. The second data 414 can include a second SIP request (e.g., another REGISTER or INVITE) specifying a signaling chain that omits the ATCF. The signaling chain can be specified by a Record-Route header stack. For example, the ATCF can receive the SIP request from a P-CSCF and pass the request along to the S-CSCF without adding a Record-Route header for itself if SRVCC is not supported. In other examples, the P-CSCF can be arranged between the ATCF and the S-CSCF.

In some prior examples of SRVCC, when a SIP REGISTER succeeds, the ATCF receives a SIP 2xx response including a Feature-Caps header indicating support for SRVCC. The ATCF then sends a SIP MESSAGE request to the SCCAS. The SCCAS responds to the ATCF confirming binding and SRVCC capability. The SCCAS and the ATCF both reserve SRVCC resources. Therefore, when an INVITE for the registered terminal is sent, the ATCF and the SRVCC are both prepared to support SRVCC. By contrast, in some examples herein, the server 304 removes the Feature-Caps header value from, or determines not to add the Feature-Caps header or header value to, the REGISTER request or 2xx response. In response, the ATCF does not send the SIP MESSAGE to the SCCAS, so the SCCAS does not reserve SRVCC resources. Also in response, the ATCF does not reserve SRVCC resources. Therefore, removing the Feature-Caps header can save SRVCC resources without requiring changes to the ATCF or SCCAS themselves, in some examples. Similar processing can also be performed with respect to INVITEs or Sh pulls, as described herein.

Figure 5:
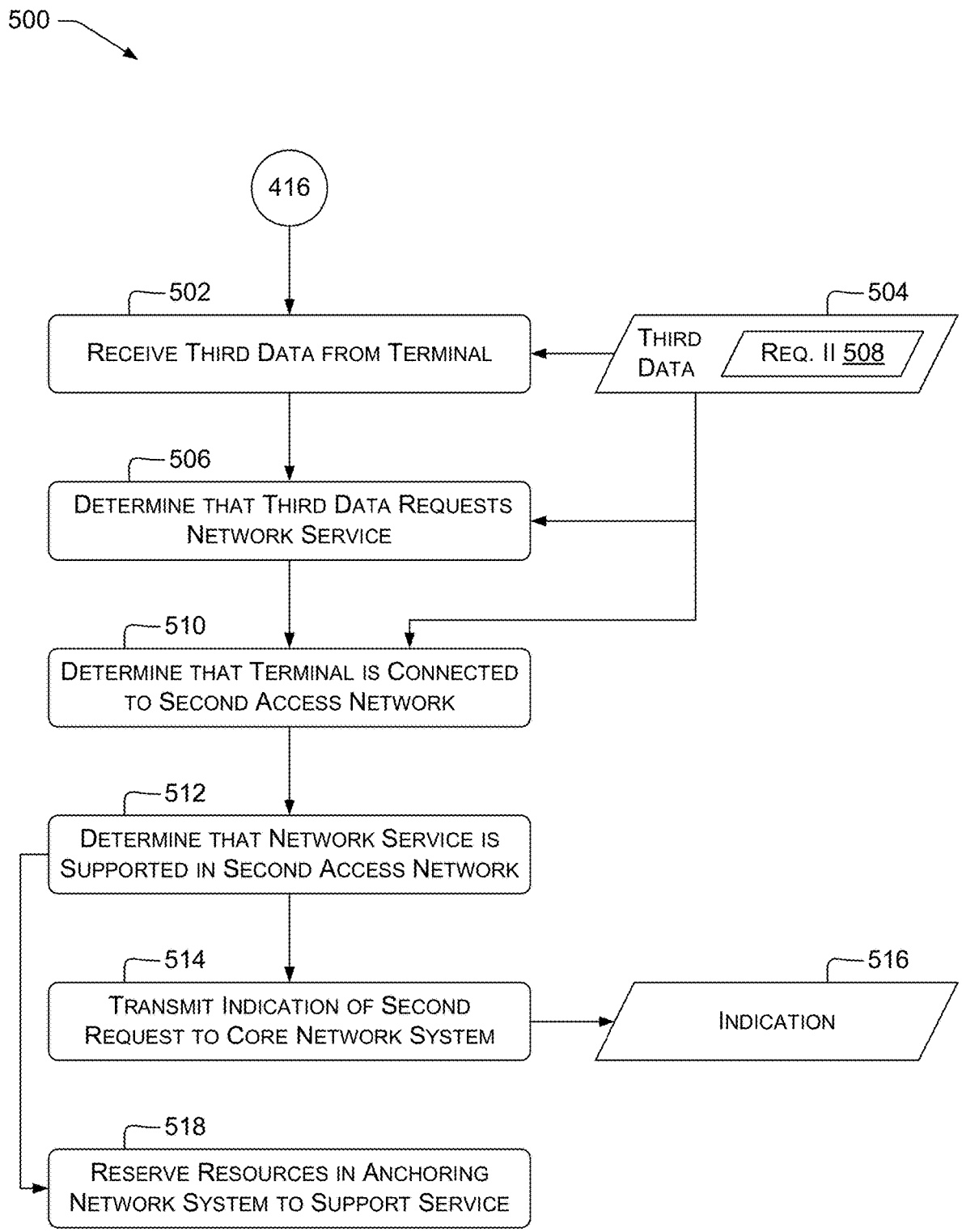
FIG. 5 illustrates an example process for enabling a network service, with respect to a terminal in a particular access network, according to some implementations.

FIG. 5 is a dataflow diagram illustrating an example process 500 for controlling access to network services, and related data items. Process 500 can be performed, e.g., by a control device, e.g., the server 304, FIG. 3. In some examples, block 416 can be followed by block 502. Some examples of process 500 permit re-enabling SRVCC on session establishment (e.g., SIP INVITE) if the terminal has changed access networks since the time of registration (e.g., SIP REGISTER). Accordingly, in some examples of process 500, the first data comprises a registration request such as a SIP REGISTER request.

At 502, in some examples, server 304 can receive third data 504 from the terminal 102 via the communications interface. For example, the third data 504 can include a SIP INVITE request, or a SIP REGISTER request (e.g., a re-REGISTER).

At 506, in some examples, server 304 can determine that the third data 504 includes a second request 508 for the predetermined network service. Examples are discussed herein, e.g., with reference to block 406.

At 510, in some examples, server 304 can determine that the terminal 102 is connected to a second access network. The second access network can be a different access network than that referenced above with reference to block 410. For example, block 406 can include recording location information. At block 510, server 304 can compare updated location information of the terminal 102 with the recorded location information. If they differ, e.g., in LAC, Tracking Area Code (TAC) or E-UTRAN Cell Identity (ECI), or in coordinates above a predetermined threshold, server 304 can determine that the terminal is connected to the second access network.

At 512, in some examples, server 304 can determine that the predetermined network service is supported in the second access network. Examples are discussed herein, e.g., with reference to block 410. Block 512 can be followed by block 514 or block At 514, in some examples, server 304 can transmit an indication 516 of the second request to the core network system. For example, server 304 can transmit a copy of at least a portion of the third data 504 as the indication 516. Some examples include receiving the third data 504 including a SIP INVITE, and transmitting the indication 516 including a forwarded INVITE with the Contact, Route, or Via headers adjusted.

At 518, in some examples, server 304 can, in response to the determination that the predetermined network service is supported in the second access network, allocate resources in the anchoring network system 122 to support the predetermined network service. For example, an ATCF or P-CSCF can store data identifying the terminal 102 or otherwise of use in providing the network service. Such data can include, e.g., an STN-SR.

In some examples, process 400 or 500 can be used to determine whether or not an ATCF should be included in the signaling chain for a session. For example, if SRVCC is not possible in the access network to which terminal 102 is connected, omitting the ATCF from the signaling chain saves ATCF resources and reduces signaling delay. In some examples, the first data comprises a Session Initiation Protocol (SIP) REGISTER request, the predetermined network service comprises at least Single-Radio Voice Call Continuity (SRVCC) or Evolved SRVCC (eSRVCC), the third data comprises a SIP INVITE request, the anchoring network system comprises a Proxy Call Session Control Function (P-CSCF), and the core network system comprises an Access Transfer Control Function (ATCF). In other examples, the anchoring network system comprises an ATCF and the core network system comprises a P-CSCF, or the first data comprises a SIP INVITE request, or the third data comprises a SIP REGISTER request, or any combination thereof.

In process 400, when terminal 102 is in an access network that does not support SRVCC, server 304 can determine second data 414 omitting a Feature-Caps entry requesting SRVCC from the Feature-Caps header. For example, at block 412, server 304 can determine a Feature-Caps header of the second data 414 by removing or omitting any, any subset, or all of the items listed in Table 1, or other present or future ATCF-, ATGW-, or SRVCC-related media feature-tags, that were specified in the request 408. When the ATCF or other core network system (e.g., an S-CSCF, if the P-CSCF sends directly to the S-CSCF, bypassing the ATCF) receives the second data 414 indicating that SRVCC should not be used, the ATCF or other core network system can choose not to attach the ATCF to the signaling chain. For example, the ATCF can forward the second data 414 without adding a Record-Route header with its address, or the S-CSCF can note that responses should be sent directly to the P-CSCF instead of to the ATCF.

TABLE 1

| Type | Item Name(s) |
| --- | --- |
| Media feature-tag | g.3gpp.srvcc-alerting |
| | g.3gpp.cs2ps-srvcc-alerting |
| | g.3gpp.cs2ps-srvcc |
| | g.3gpp.ps2cs-srvcc-orig-pre-alerting |
| Feature-capability indicator | g.3gpp.atcf |
| | g.3gpp.atcf-mgmt-uri |
| | g.3gpp.srvcc |
| | g.3gpp.atcf-path |
| | g.3gpp.cs2ps-srvcc |
| | g.3gpp.ps2cs-srvcc-orig-pre-alerting |
| | g.3gpp.mid-call |

In process 500, once terminal 102 has moved to an access network that does support SRVCC, server 304 can determine indication 516 including SRVCC-related feature-tags, feature-capability indicators, or other items discussed above (e.g., in Table 1) from the Feature-Caps header. Then, for example, the ATCF can add its address in a Record-Route header, or the S-CSCF can send requests to the ATCF instead of the P-CSCF. The examples given above are not limiting. For example, other network types may include SRVCC information in other SIP headers, or may otherwise specify requests or parameters for predetermined network services. Processes 400 and 500 can be performed with respect to any of those requests or parameters. In some examples, operation 412 includes removing all data (e.g., feature tags or header values) related to the predetermined network service; in other examples, operation 412 includes removing less than all data related to the predetermined network service.

Figure 6:
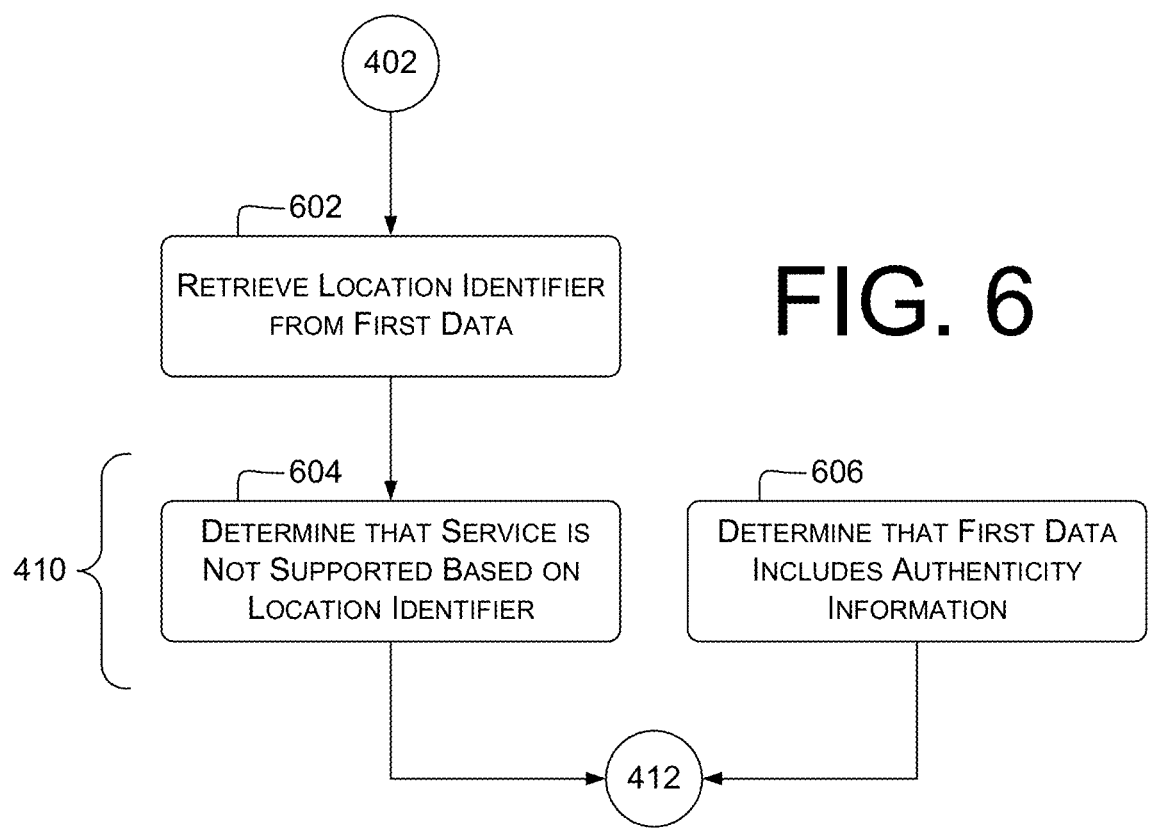
FIG. 6 illustrates an example process for determining whether a service is supported in an access network according to some examples.

FIG. 6 is a dataflow diagram illustrating an example process 600 for controlling access to network services, and related data items. Process 600 can be performed, e.g., by a control device, e.g., the server 304, FIG. 3. In some examples, block 410 can include blocks 604 or 606. Blocks 604 and 606 can be performed in either order, or in parallel.

At 602, in some examples, server 304 can retrieve a location identifier from the first data 404. The location identifier can be associated with the access network. In some examples, the first data 404 comprises a location header comprising the location identifier. For example, the location header can be a custom header provided by the UE, e.g., as discussed herein with reference to FIG. 12.

In some examples, the first data 404 comprises a location-information SIP header that includes an access-network-information (ANI) value. The location-information header can be, e.g., a P-Access-Network-Info or Cellular-Network-Info header. The ANI value comprises a TAC, and the location identifier comprises at least a portion of the TAC. Table 2 shows an example ANI value, TAC, and location identifier.

TABLE 2

| Item | Value |
| --- | --- |
| SIP header | P-Access-Network-Info: 3GPP-E-UTRAN-FDD; utran-cell-id-3gpp=3102603c34138e603 |
| ANI value | 3102603c34138e603 |
| MCC | 310 |
| MNC | 260 |
| TAC | 3c34 |
| ECI | 1383603 |
| Location identifier | 3c |

Table 2 shows an example of PANI for an EUTRAN access. In Table 2, the ANI value is a "utran-cell-id-3gpp" string that is the concatenation of the MMC, MNC, TAC, and ECI (24.229 v13.4.1 § 7.2.15.3, #4, and § 7.2A.4.3, #12). Server 304 can extract the location identifier from the ANI value or the TAC using a predetermined rule, e.g., a regular expression such as /=.{6} (..)/(which stores the TAC into match result \1), or a string-extraction function.

TABLE 3

| Item | Value |
| --- | --- |
| SIP header | P-Access-Network-Info: 3GPP-UTRAN-FDD; utran-cell-id-3gpp=3102602c401df131d; network-provided |
| ANI value | 3102602c401df131d |
| MCC | 310 |
| MNC | 260 |
| LAC | 2c40 |
| CI | 1df131d |
| Location identifier | 2c |

Table 3 shows an example of PANI for a UTRAN access. Table 3 is similar to Table 2, except that a LAC is used in place of the TAC, and a UMTS Cell Identity (CI) is used in place of the ECI. In Tables 2 and 3, line breaks in the "SIP header" row are for clarity, and are not required in the actual SIP header.

At 604, in some examples, server 304 can determine that the predetermined network service is not supported in the access network based at least in part on the location identifier. For example, server 304 can look up the location identifier or portion thereof in mapping 332 (e.g., a database), or execute a function that takes a location identifier and returns a Boolean indicator of whether the feature is supported.

The TAC is four hexadecimal digits, and is assigned by the operator of a PLMN. In some examples, the operator uses a portion of the TAC, e.g., the first two hex digits, to indicate an LTE band or other deployment type of the corresponding access network. For example, a location identifier of 2c can be associated with LTE band 4, and a location identifier of 3c or 4c can be associated with LTE band 12. Band 4 may support both LTE and UMTS (3G) coverage, and may therefore support SRVCC. By contrast, band 12 may only support LTE coverage, and may therefore not support SRVCC. Mapping 332 can therefore include the entries (2c→true, 3c→false, 4c→false) with respect to SRVCC. Server 304 can look up the location identifier in mapping 332 to determine whether SRVCC is supported. In this example, SRVCC would not supported for Table 2, but would be supported for Table 3. In some examples, mapping 332 can include data for other services, or for multiple services. In some examples, other mappings between TAC and location identifier can be used, or the entire TAC can be the location identifier.

At 606, in some examples, server 304 can determine that the first data 404 includes authenticity information. Block 606 can be followed by block 412 of determining the second data 414. For example, server 304 can determine that a location header (e.g., a PANI header) includes or is associated with a value indicating that the location header was provided or validated by an SBG, S-GW, or another network entity. This can increase robustness against misbehaving or compromised terminals 102. An example of authenticity information is the "network-provided" PANI header field parameter shown in Table 3.

Figure 7:
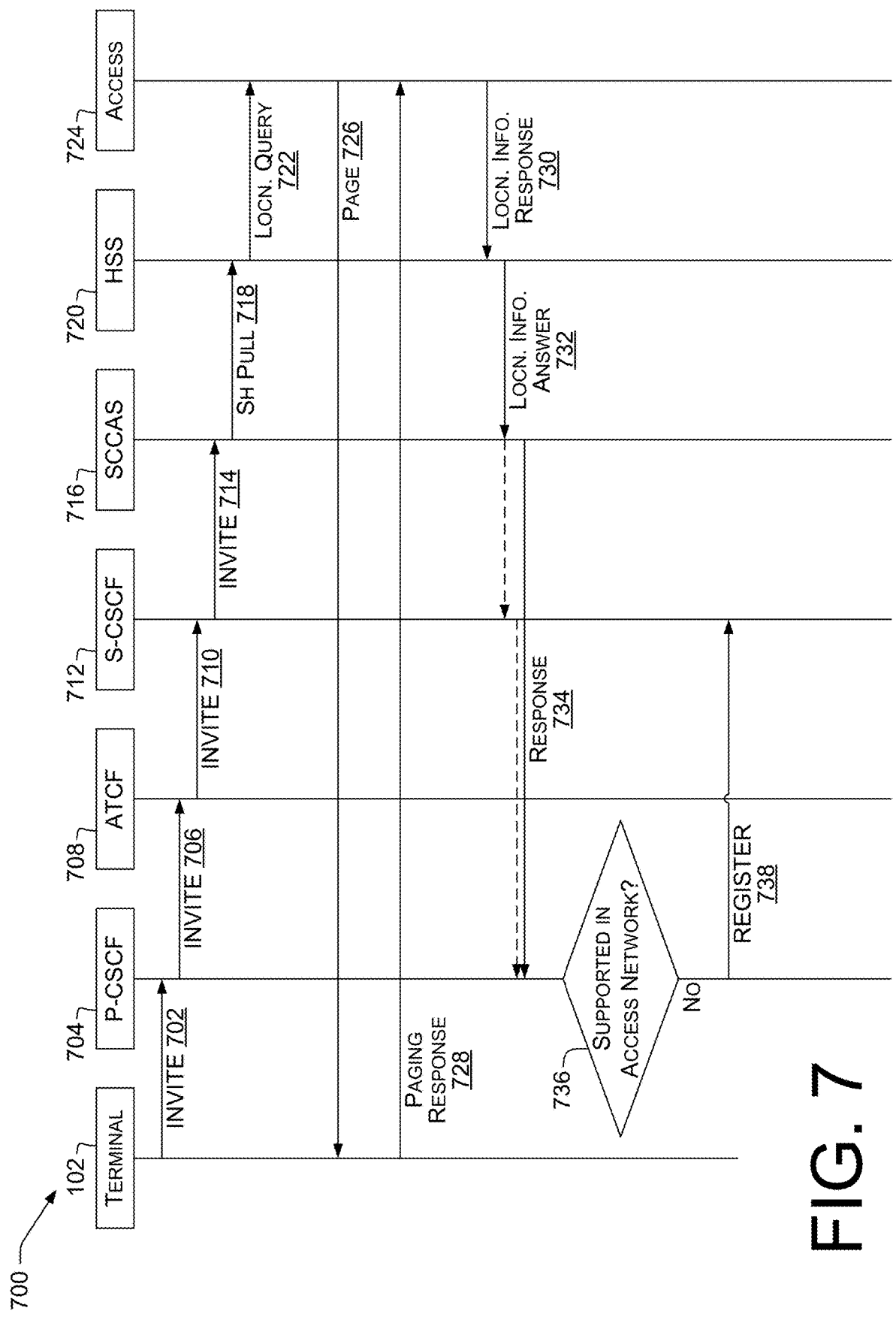
FIG. 7 shows an example call flow illustrating disabling a network service, with respect to a terminal in a particular access network.

FIG. 7 shows a call flow 700 illustrating an example of removing an ATCF from the SIP signaling chain of a session in which SRVCC is not supported. Flow 700 is shown with respect to a SIP INVITE. However, this is not limiting, and the flow can additionally or alternatively be used for a SIP REGISTER, SIP SUBSCRIBE, or other request. In the illustrated example, call flow 700 uses network-provided location information (NPLI) to determine whether SRVCC is supported.

Terminal 102 sends INVITE 702 to P-CSCF 704 (e.g., via a P-GW, SBG, or other components not shown). P-CSCF 704 forwards the INVITE 706 to ATCF 708, which forwards the INVITE 710 to S-CSCF 712, which forwards the INVITE 714 to SCCAS 716. Each forwarding operation includes adjusting Via, Route, or Record-Route headers, or other headers, as necessary.

SCCAS 716 transmits a Location Information Request 718 via the Sh interface to HSS 720 ("Sh Pull"). This is an example of an NPLI request using HSS interrogation. In response, HSS 720 transmits a location information query 722 to an access system 724. The access system 724 can include components described herein of an access network, or other components. For example, access system 724 can include an SGSN, RNC, MME, or MSC. Access system 724 can, if necessary, send a paging message 726 to terminal 102, e.g., via a NodeB or eNodeB. Terminal 102 can respond to access system 724 with a paging response 728. Additionally or alternatively, if access system 724 already has stored location information considered to be reliable based upon predetermined criteria, access system 724 can omit paging. Whether paging is used or not, access system 724 can, once it has location information, send a location information provision response 730 to HSS 720.

HSS 720, upon receiving the response 730, can provide a location-information answer 732 (e.g., a Diameter LIA) to SCCAS 716. Alternatively, HSS 720 can send the response to S-CSCF 712, as indicated by the dashed arrow. Whichever device 716, 712 receives the answer 732 can transmit a response 734 (e.g., a forwarded LIA) to the P-CSCF 704 (response 734 from the S-CSCF 712 indicated by the dashed arrow).

At 736, P-CSCF 704, based at least in part on the response 734, can determine whether a network service (SRVCC, in this example) is supported in the access network to which terminal 102 is connected. In response to a determination that the service is not supported, P-CSCF 704 can transmit a SIP REGISTER request 738 to S-CSCF 712, bypassing ATCF 708. Request 738 can cause route caches to be flushed or rebuilt in S-CSCF 712 or other network devices, so that future signaling traffic for terminal 102 will not be routed through ATCF 708. This reduces the load on ATCF 708 by permitting ATCF 708 to handle traffic only for terminals 102 that may perform SRVCC, in some examples. In some examples, request 738 does not change the routing from terminal 102 to P-CSCF 704, thereby increasing routing flexibility. In some examples, request 738 includes an IMSI or other identifying information of terminal 102.

In some examples, the P-CSCF 704 and ATCF 708 are co-located in a single device or coordinated group of devices. In response to the determination that the service is not supported, accordingly, internal configuration of that device or group of devices can be adjusted so that future traffic will not be processed by the ATCF 708 functions in the device or group of devices.

In some examples, the P-CSCF and the ATCF, or the SCCAS and TAS, are colocated or otherwise implemented together in a single device or group of device(s). In some examples, messages discussed herein between devices embodied in a colocated manner can represent inter-process, inter-thread, or other internal communication mechanisms (e.g., via shared memory or pipes), or modifications of stored data, e.g., in RAM of the device or device(s).

In some examples, location information can be conveyed between an MME and an HSS, or other network devices, in a protocol information element (IE). For example, the mobile-station (MS) network capability IE includes a bit indicating whether or not SRVCC to GERAN/UTRAN is supported (3GPP 24.008 v13.5.0 p. 560). In some examples, the MME, HSS, or other network device can add or remove Feature-Caps header(s) or value(s) based at least in part on the value of this bit with respect to a particular terminal.

Figure 8:
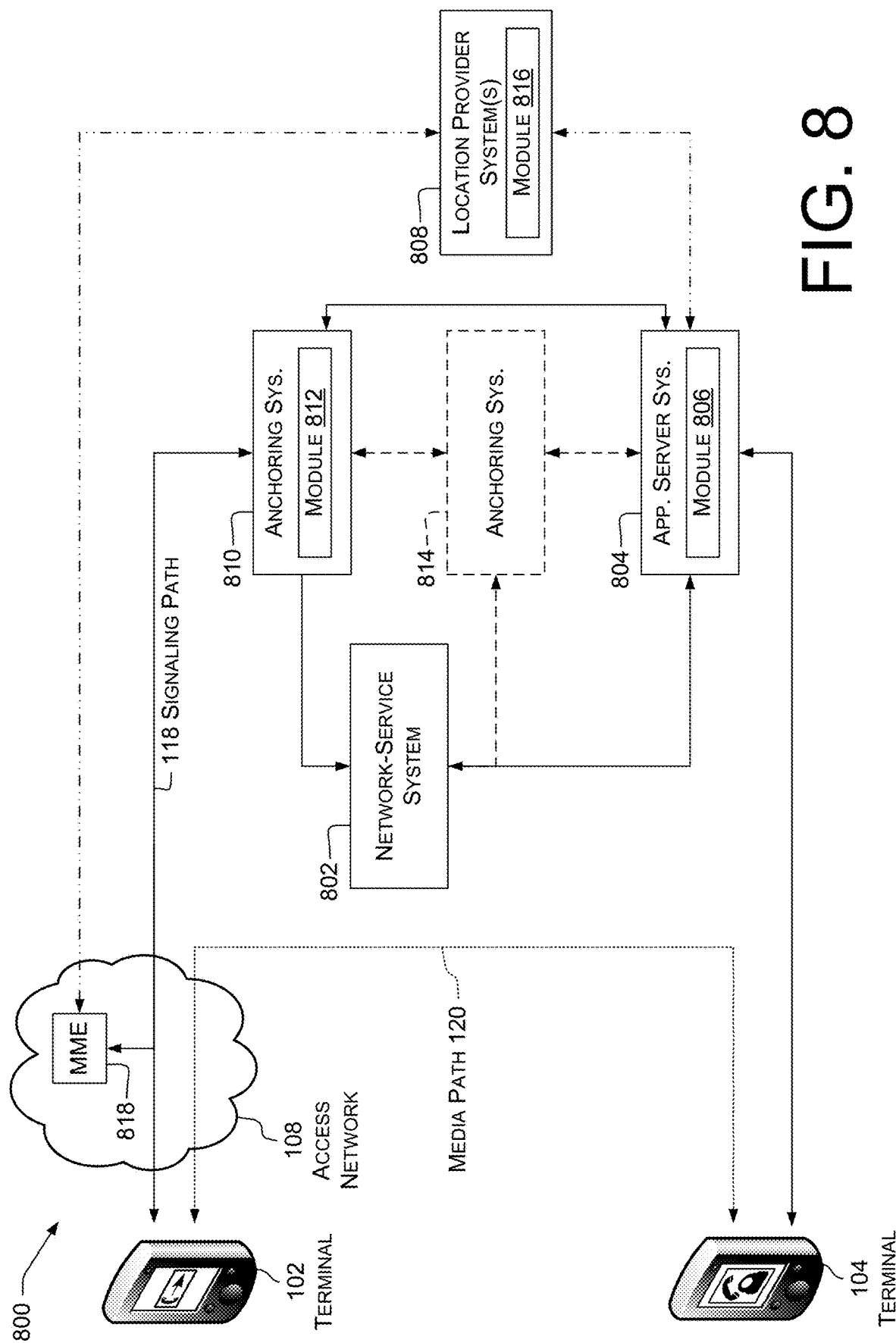
FIG. 8 illustrates an example telecommunications network, including components used to perform service-access control of a communication session.

FIG. 8 is a block diagram illustrating a telecommunications network 800 according to some examples. Terminals 102 and 104, access network 108, signaling path 118, and media path 120 are as in FIG. 1. As with FIG. 1, systems described with reference to FIG. 8 can be implemented as standalone device(s), or combined with other network functions into a single device or collection of device(s).

A network-service system 802 is associated with a predetermined network service. For example, the network-service system 802 can be configured to provide or facilitate provision of the network service. In an example, the service is eSRVCC and the network-service system 802 is an ATCF.

Figure 9:
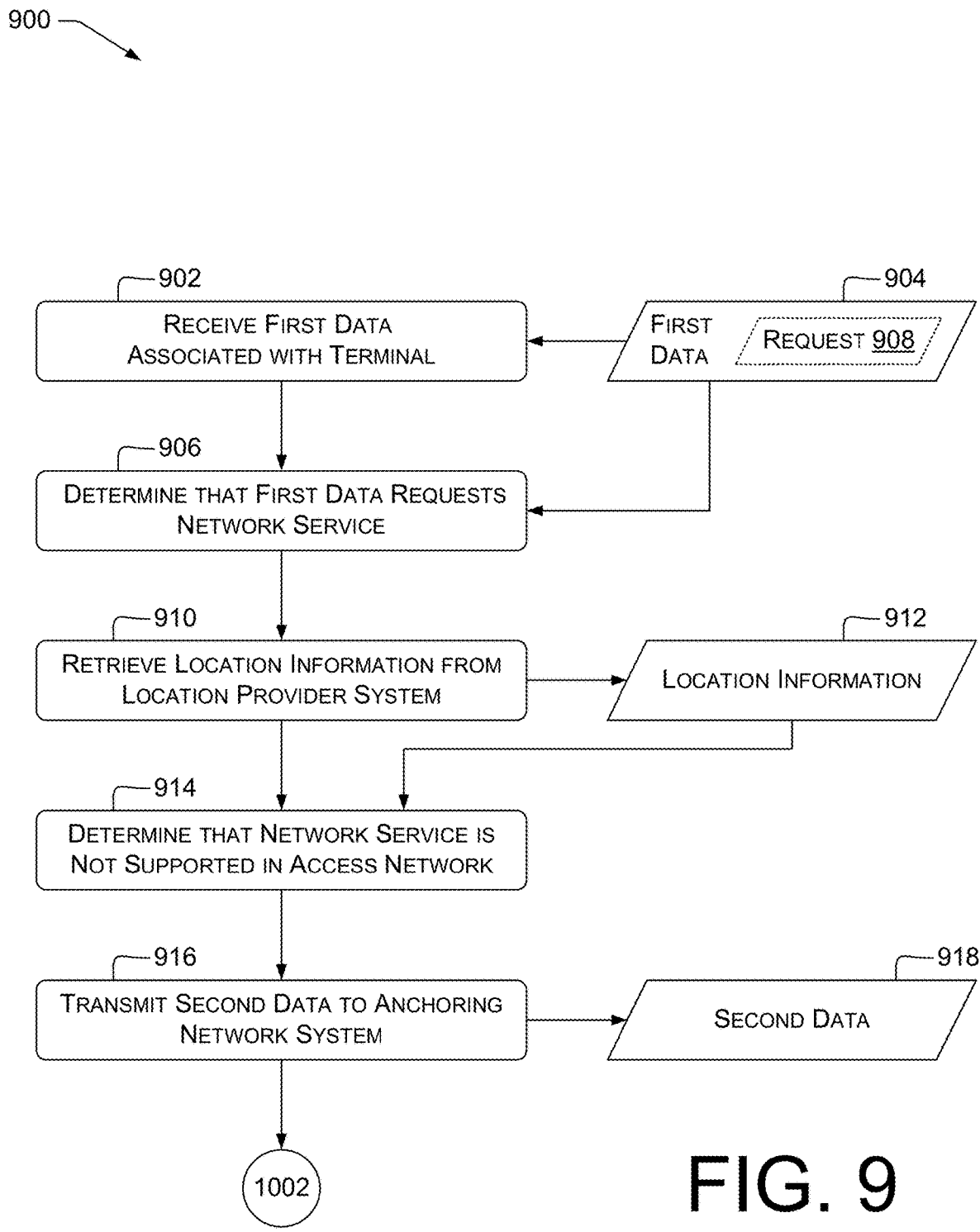
FIG. 9 illustrates example processes for controlling access to network services according to some implementations.

An application-server system 804, which can represent application-server system(s) 106, FIG. 1, is configured to perform processing specified by module 806, described herein with reference to FIG. 9. For example, the service can be SRVCC or eSRVCC and the application-server system 804 can be an SCCAS. In some examples, the application-server system 804 can communicate with a location provider system 808 while executing module 806. The location provider system may be part of network 800 or may be separate from network 800 and communicatively connectable therewith, as indicated by the phantom arrows.

Figure 10:
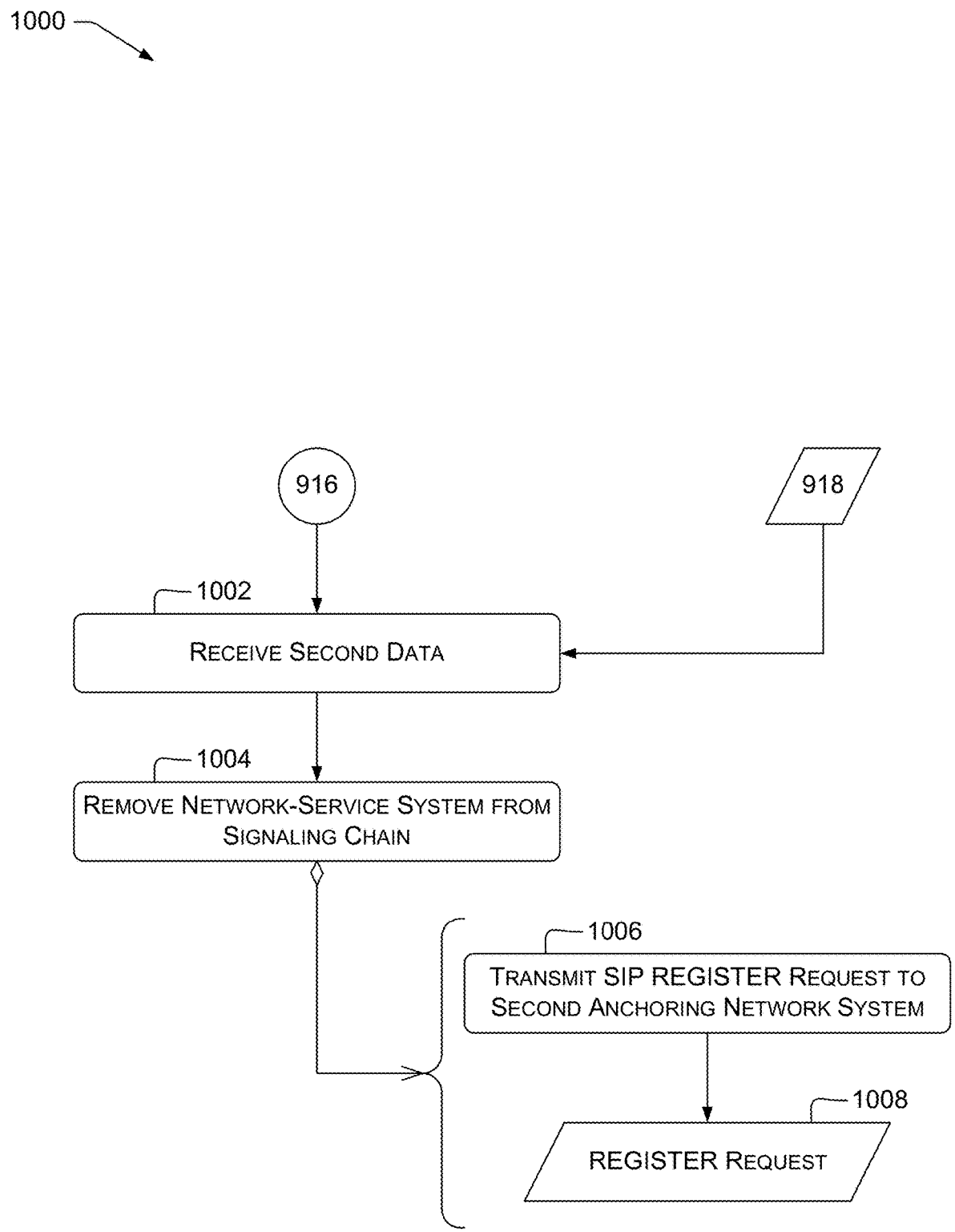
FIG. 10 illustrates example processes for controlling access to network services according to some implementations.

A first anchoring network system 810, which can represent anchoring network system(s) 122, FIG. 1, is configured to perform processing specified by module 812, described herein with reference to FIG. 10. For example, the first anchoring network system 810 can be a P-CSCF. The first anchoring network system 810 is connected on signaling path 118 between terminal 102 and application-server system 804.

In some examples, network 800 includes a second anchoring network system 814, which can represent anchoring network system(s) 122, FIG. 1. Second anchoring network system 814 can be configured to relay messages between the first anchoring network system 810 and the application-server system 804, as indicated by the dashed arrows. For example, second anchoring network system 814 can include an S-CSCF. There can be other devices in the signaling chain in addition to those shown. In some examples, network-service system 802 can communicate with application-server system 804 via second anchoring network system 814, also as shown by the dashed arrows.

In some examples, the network 800 includes the location provider system 808, which can represent location provider system(s) 126, FIG. 1. For example, location provider system 808 can be or include an HSS or LRF. The location provider system 808 is configured to perform processing specified by module 816, described herein with reference to FIG. 11.

In some examples, access network 108 includes a Mobility Management Entity (MME) 818 or similar device facilitating mobility within or between access networks. Location provider system 808, in some examples, is configured to communicate with MME 818 to determine location information of terminal 102. Examples are discussed herein, e.g., with reference to FIG. 11.

FIG. 9 is a dataflow diagram illustrating an example process 900 for controlling access to network services, and related data items. Process 900 can be performed, e.g., by an application-server system 804 of a telecommunications network 800, e.g., an SCCAS or other server 304. The application-server system 804 can communicate with user equipment, e.g., terminal 102, 202, or 302, of telecommunications network 800. In some examples, the application-server system 804 includes one or more processors (e.g., processor 326) configured to perform operations described below, e.g., in response to computer program instructions of the module 806.

At 902, in some examples, the application-server system 804 can receive first data 904 associated with terminal 102 of the telecommunications network 800. First data 904 can include, e.g., a SIP REGISTER or INVITE request. Examples are discussed herein, e.g., with reference to block 402. In some examples, first data 904 comprises INVITE 714.

At 906, in some examples, the application-server system 804 can determine that the first data 904 includes a request 908 for a predetermined network service. Examples are discussed herein, e.g., with reference to block 406. Additionally or alternatively, the first data 904 can itself be the request. For example, an S-CSCF may only transmit the first data 904 if the Initial Filter Criteria (iFCs) specify that the network service is requested. An S-CSCF may omit the application-server system 804 from the signaling chain (e.g., transmit no messages to application-server system 804) if the iFCs do not indicate the service is requested. Request 910 is depicted using a dotted outline to indicate that request 910 may be a portion of first data 904 or the entirety of, or existence of, first data 904, in various examples.

At 910, in some examples, the application-server system 804 can retrieve location information 912 of the terminal 102 from the location provider system 808. Application-server system 804 can, e.g., perform an Sh pull, i.e., transmit a Diameter User-Data-Request and receive a User-Data-Answer via the Sh interface from the AS to the HSS. Examples are discussed herein, e.g., with reference to request 718 and location-information answer 732. The location information 912 can include a PANI value or other location information described herein. In some examples, the location information 912 can include the tracking area identity (TAI) of the tracking area in which terminal 102 is located. The TAI includes the MCC, MNC, and TAC. Accordingly, in some examples, block 910 can include extracting the location information 912 (e.g., a TAC) from data (e.g., a TAI) received from the location provider system 808. Examples are discussed herein, e.g., with reference to block 602 and Table 2.

At 914, in some examples, the application-server system 804 can determine, based at least in part on the location information 912, that the predetermined network service is not supported in an access network 108 to which the terminal 102 is connected. Examples are discussed herein, e.g., with reference to blocks 410, 604, or 736. For example, mapping 332 can be accessed, using location information 912 as a key, to retrieve a value indicating whether the service is supported.

In some examples, as discussed herein with reference to block 1110, the location information 912 can indicate whether a LAC for terminal 102 was provided by MME 818. Accordingly, in some examples, block 914 can include determining that the predetermined network service is not supported in response to the location information 912 indicating the LAC was not provided by the MME.

At 916, in some examples, the application-server system 804 can transmit second data 918 indicating that the predetermined network service is not supported in the access network 108. The second data 918 can include, e.g., a SIP MESSAGE request. Block 916 can include sending the second data 918 to the anchoring network system 810, e.g., a P-CSCF. In some examples, block 916 can be followed by block 1002, which can be performed at the anchoring network system 810.

In some examples, block 916 takes place after initial registration. For example, the first data 904 can include a Session Initiation Protocol (SIP) INVITE request, and the second data 918 can include a SIP MESSAGE request.

In some examples, the first data 904 can include a Session Initiation Protocol (SIP) INVITE request, and the second data 918 can include a SIP 183 response. The application-server system 804 can transmit the second data 918 to an S-CSCF (e.g., system 814), which can then forward the response to the P-CSCF or other anchoring network system 810.

FIG. 10 is a dataflow diagram illustrating an example process 1000 for controlling access to network services, and related data items. Process 1000 can be performed, e.g., by an anchoring network system 810 of a telecommunications network 800, e.g., a P-CSCF or other server 304. The anchoring network system 810 can communicate with user equipment, e.g., terminal 102, 202, or 302, of telecommunications network 800. In some examples, the anchoring network system 810 includes one or more processors (e.g., processor 326) configured to perform operations described below, e.g., in response to computer program instructions of the module 812.

At 1002, in some examples, the anchoring network system 810 can receive the second data 918.

At 1004, in some examples, the anchoring network system 810 can, in response to the second data 918, remove the network-service system 802, e.g., an ATCF, from a signaling chain associated with the terminal 102 (e.g., associated with a registration or a session of terminal 102).

In some examples, block 1004 can include block 1006 of transmitting a Session Initiation Protocol (SIP) REGISTER request 1008 to the second anchoring network system 814. The request 1008 can be, e.g., a re-REGISTER from the P-CSCF to the S-CSCF. The request 1008 is not routed through the network-service system 802. This prevents the network-service system 802 from adding a Record-Route SIP header to the request 1008. This prevents the network-service system 802 from adding itself to the recorded route for request 1008 and subsequent requests using the same route.

Figure 11:
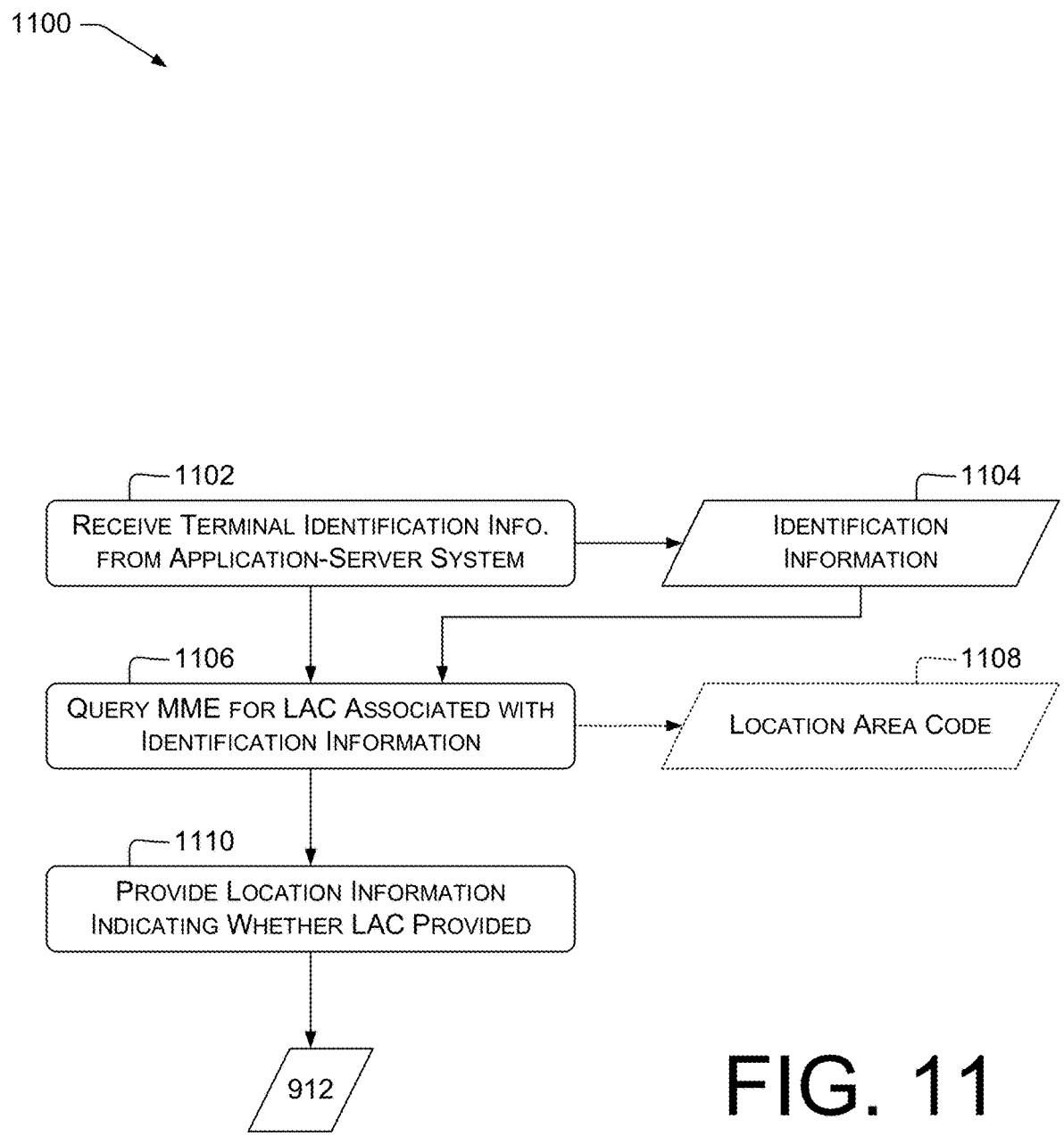
FIG. 11 illustrates example processes for determining location information according to some implementations.

FIG. 11 is a dataflow diagram illustrating an example process 1100 for controlling access to network services, and related data items. Process 1100 can be performed, e.g., by a location provider system 808 of a telecommunications network 800, e.g., a P-CSCF or other server 304. The location provider system 808 can communicate with user equipment, e.g., terminal 102, 202, or 302, of telecommunications network 800. In some examples, the location provider system 808 includes one or more processors (e.g., processor 326) configured to perform operations described below, e.g., in response to computer program instructions of the module 816.

At 1102, in some examples, the location provider system 808 can receive identification information 1104 associated with the terminal from the application-server system 804. In some examples, the identification information can includes at least one of: a terminal identifier such as an international mobile equipment identity (IMEI), a network identifier such as a mobile country code (MCC) and a mobile network code (MNC), a user identifier such as an international mobile subscriber identity (IMSI) (which can include an MCC and an MNC), a user address such as an E.164 international-dialing-plan telephone number, mobile station international subscriber directory number (MSISDN), a network address, such as an Internet IPv4 or IPv6 address, or a country code, e.g., indicating a country in which terminal 102 is located. In some examples, the identification information can include an identifier of a Mobile virtual network operator (MVNO) determined from the IMSI of terminal 102.

In some examples, terminal 102 can provide the identification information to application-server system 804 during a process of attaching to a network, e.g., in an S1AP Initial UE Message. In some examples, terminal 102 can provide the identification information in another message. For example, a SIP REGISTER request or a SIP INVITE request can include a P-Access-Network-Info (PANI) header. The cell global identity (CGI) of the cell (e.g., eNodeB) serving the terminal 102 can be retrieved from the "cgi-3gpp" parameter of the PANI header. The cgi-3gpp parameter can include the MCC, MNC, location area code (LAC), and cell identity (CI).

At 1106, in some examples, the location provider system 808 can query a Mobility Management Entity (MME) 818 for a Location Area Code (LAC) 1108 associated with the identification information 1104. The LAC is present if the terminal 102 indicated by the identification information 1104 is registered in a circuit-switched domain. For example, location information response 730 can include Location Area Identification (LAI). LAI includes an MCC, MNC, and LAC. Therefore, in some examples, block 1106 can include extracting the LAC from response 730 or another transmission from the MME 818 (or other access system 724).

At 1110, in some examples, the location provider system 808 can provide the location information 912 including a bit or other value indicating whether or not the LAC 1108 was provided by the MME 818 in response to the query. Block 1110 can be followed, on the application-server system 804, by block 914.

Figure 12:
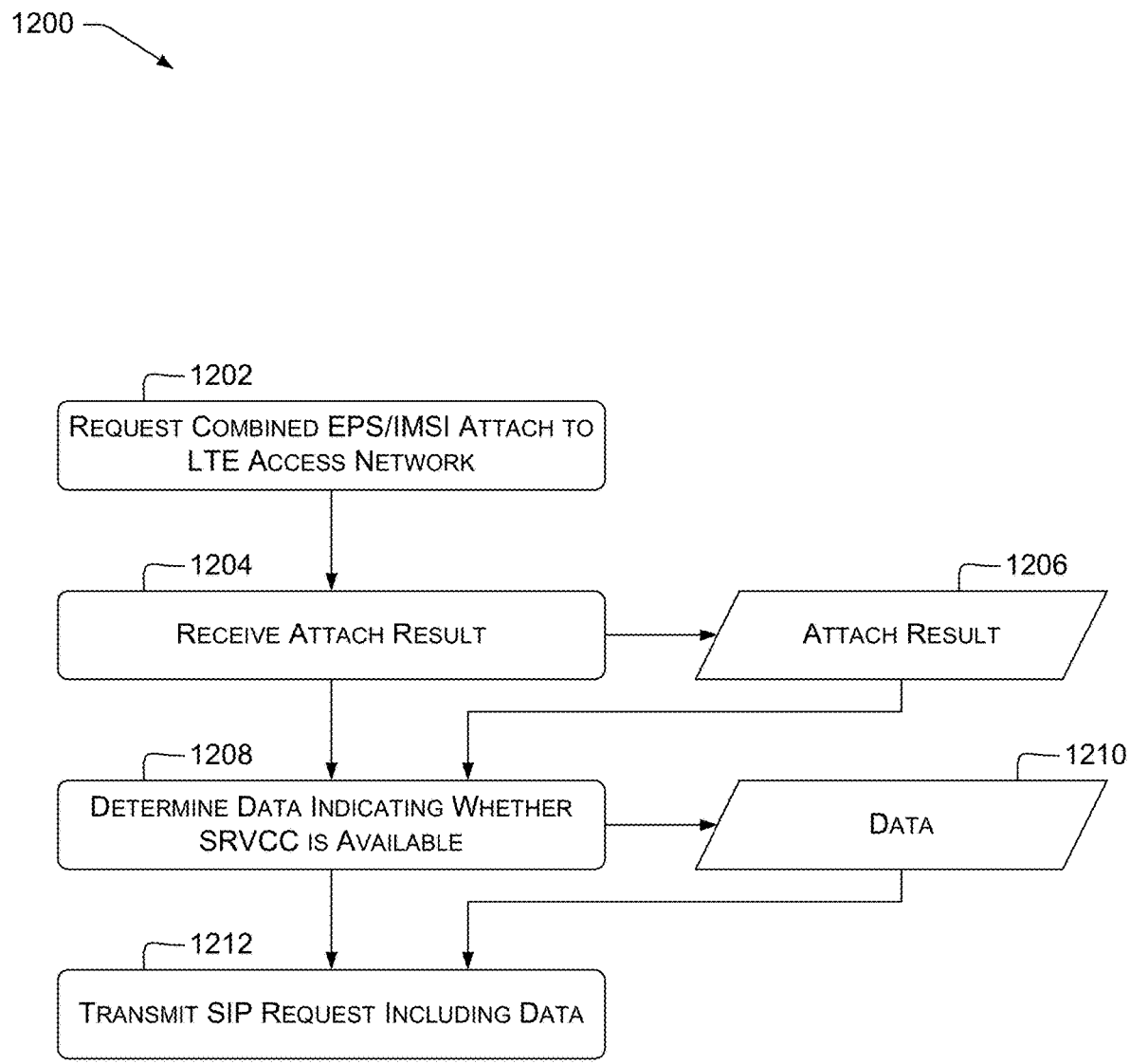
FIG. 12 illustrates example processes for determining service availability based on location information according to some implementations.

FIG. 12 is a dataflow diagram illustrating an example process 1200 for reporting location information, and related data items. Process 1200 can be performed, e.g., by a terminal 102, 302 of a telecommunication network (or system) 100, 800, e.g., Long Term Evolution (LTE) user equipment (UE). The terminal 102 can communicate with other components of telecommunication network (or system) 100, 800, e.g., anchoring network system(s) 122, 810, e.g., via a radio or other communications interface 318. In some examples, the terminal 102 includes one or more processors or other controller(s) (e.g., processor 312) configured to perform operations described below, e.g., in response to computer program instructions of the reporting module 324.

At 1202, in some examples, terminal 102 can request a combined Evolved Packet System (EPS)/International Mobile Subscriber Identity (IMSI) attach to an LTE access network via the radio. Block 1202 can include transmitting a request via the radio. The request can include a Non-Access Stratum (NAS) Attach Request message with an EPS attach type of "combined EPS/IMSI attach." Terminal 102 can transmit the Attach Request to MME 818 or other access system(s) 724.

At 1204, in some examples, terminal 102 can receive an attach result 1206 via the radio. For example, the attach result 1206 can include a NAS Attach Accept message. The Attach Accept message can be carried in a DedicatedInfoNAS IE of an RRCConnectionReconfiguration IE, in some examples.

At 1208, in some examples, terminal 102 can determine, based at least in part on the attach result 1206, data 1210 indicating whether single-radio voice call continuity (SRVCC) is supported. Block 1208 can include determining the data 1210 comprising a bit or other Boolean value, a header, a header value, or another indication of whether or not SRVCC is supported.

For example, if the attach result 1206 is an EPS-only attach, terminal 102 can determine that SRVCC is not supported. In some examples, if the attach result 1206 is a combined EPS/IMSI attach, terminal 102 can determine that SRVCC is supported. In some examples, terminal 102 the controller is configured to determine, in response to the attach result 1206 indicating a combined result of attach (e.g., EPS/IMSI or an evolution of or equivalent to such a result), that SRVCC is supported; and to determine, in response to the attach result 1206 indicating other than a combined result of attach, that SRVCC is not supported.

At 1212, in some examples, terminal 102 can transmit, via the radio, a Session Initiation Protocol (SIP) request including the data 1210. In some examples, the SIP request can include a P-Access-Network-Info (PANI) header, and the data 1210 can include an access-info header field of the PANI header. Examples are discussed herein, e.g., with reference to block 602 and Table 2.

In some examples, the SIP request includes at least a REGISTER or an INVITE request. In some examples, the data 1210 consists essentially of a header name and a header value indicating whether SRVCC is supported. For example, the data 1210 can be "X-SRVCC-Supported: yes" or "X-SRVCC-Supported: false". Information unrelated to SRVCC can be included in data 1210 without changing the function of data 1210 to carry an indication of the availability of SRVCC.

Figure 13:
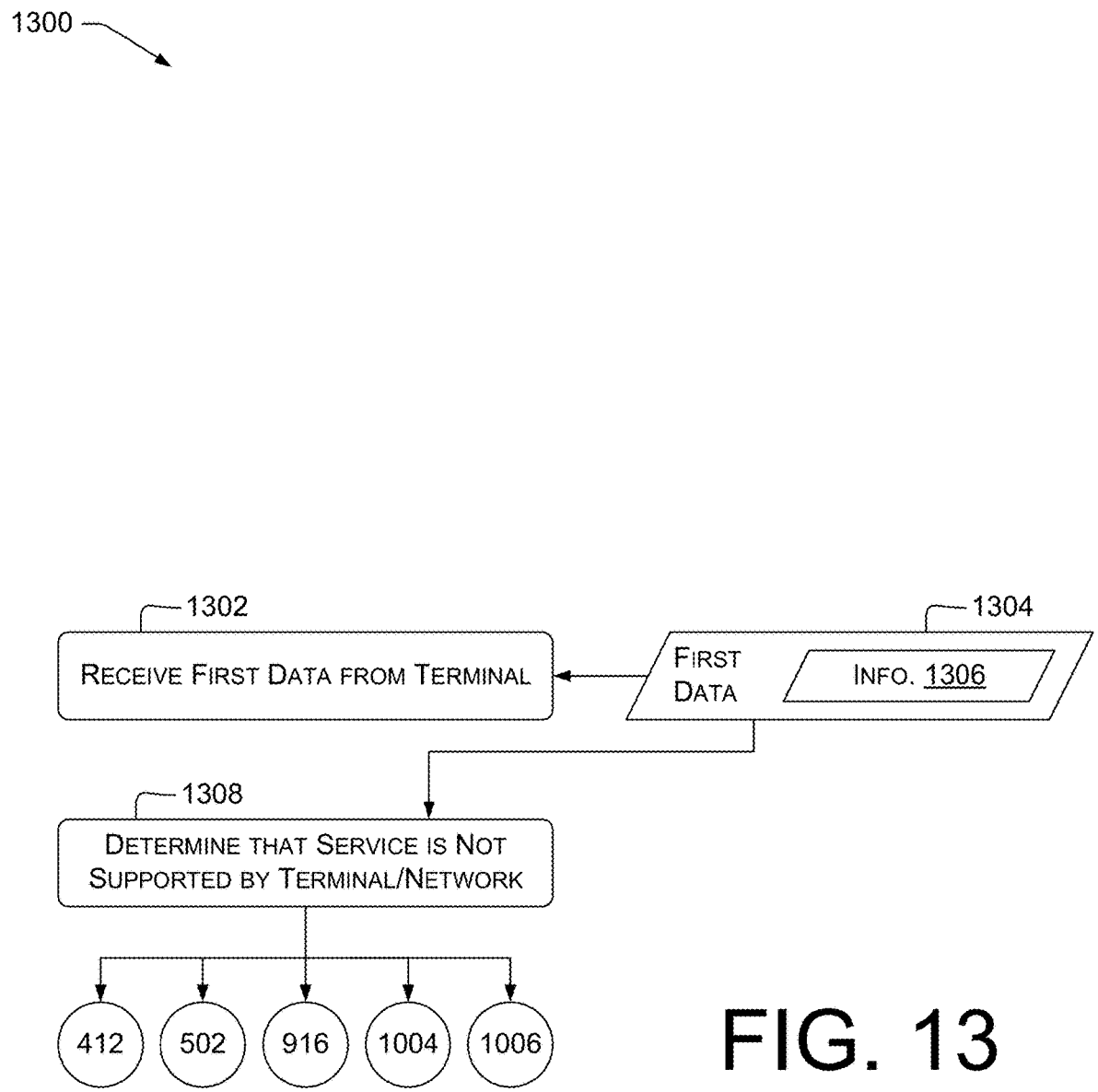
FIG. 13 illustrates example processes for controlling service access according to some implementations.

FIG. 13 is a dataflow diagram illustrating an example process 1300 for controlling access to network services, and related data items. Process 1300 can be performed, e.g., by an anchoring network system 122 of a telecommunications network, e.g., a P-CSCF or other server 304. The anchoring network system 122 can communicate with user equipment, e.g., terminal 102, 202, or 302, of telecommunications network 306. In some examples, the anchoring network system 122 includes one or more processors (e.g., processor 326) configured to perform operations described below, e.g., in response to computer program instructions of the authorization-processing module 330. In some examples of IoT devices, terminal 102 is substantially stationary or has only a single radio. Accordingly, device identity can be used in determining whether a service is supported by the device or the access network to which it is attached.

At 1302, in some examples, server 304 can receive first data 1304 from terminal 102. First data 1304 can include information 1306, e.g., identification information the value of a User-Agent header, a hostname, or other identification information described herein; or location information such as a PANI value or portion thereof, e.g., a value indicating whether terminal 102 is connected via a 4G or fifth-generation (5G) access, or other location information described herein. In some examples, blocks 402 or 502 can include extracting first data as in block 1302.

At 1308, in some examples, server 304 can determine that a predetermined network service is not supported by terminal 102 or the access network to which terminal 102 is attached, based at least in part on the information 1306. For example, server 304 can test the information 1306 against a regular expression or pattern, or look for a predetermined value within the identification information 1306. For example, the User-Agent string can be used to query FINGERBANK or another database of device characteristics indexed by User-Agent strings to determine whether the device supports the service. For example, some IoT devices that are substantially stationary and single-radio do not support SRVCC. Similarly, some 5G (UPF) access networks do not support SRVCC, so PANI values indicating those access networks are in use also indicate that SRVCC is not supported.

In some examples, block 502 can be followed by block 512, and block 512 can include performing tests described with reference to block 1308 to determine that the network service is supported by a terminal 102 in the access network to which it is attached. This can permit enabling service access based not only on location information, but additionally or alternatively on identification information.

In response to the determination that the service is not supported, block 1308 can be followed by, e.g., blocks 412 or 502, the transmission of REGISTER request 738, or blocks 916, 1004, or 1006. Sessions for terminal 102 that does not support the predetermined network service therefore will not be routed through network-service systems 802 specific to that service, or resources will not be reserved for the predetermined network service with respect to terminals that will never use that service. However, access to the service will still be available when it is supported (e.g., process 500). This saves resources and increases core-network capacity, as discussed above.

Example Clauses

Various examples include one or more of, including any combination of any number of, the following example features.

A: A method comprising, by an anchoring network system of a telecommunications network: receiving first data from a terminal of the telecommunications network via a communications interface; determining that the first data includes a request for a predetermined network service; determining that the predetermined network service is not supported in an access network to which the terminal is connected; determining second data that does not request the predetermined network service; and transmitting the second data to a core network system via the communications interface.

B: The method according to paragraph A, wherein: the first data comprises a registration request; and the method further comprises, after transmitting the second data: receiving third data from the terminal via the communications interface; determining that the third data includes a second request for the predetermined network service; determining that the terminal is connected to a second access network; determining that the predetermined network service is supported in the second access network; and transmitting an indication of the second request to the core network system.

C: The method according to paragraph B, wherein: the first data comprises a Session Initiation Protocol (SIP) REGISTER request; the predetermined network service comprises at least Single-Radio Voice Call Continuity (SRVCC) or Evolved SRVCC (eSRVCC); the third data comprises a SIP INVITE request; the anchoring network system comprises a Proxy Call Session Control Function (P-CSCF); and the core network system comprises an Access Transfer Control Function (ATCF).

D: The method according to paragraph B or C, further comprising, in response to the determination that the predetermined network service is supported in the second access network, allocating resources in the anchoring network system to support the predetermined network service.

E: The method according to any of paragraphs A-D, the anchoring network system comprises an Access Transfer Control Function (ATCF); the core network system comprises a Serving Call Session Control Function (S-CSCF); the first data comprises a first Session Initiation Protocol (SIP) request; and the second data comprises a second SIP request specifying a signaling chain that omits the ATCF.

F: The method according to any of paragraphs A-E, further comprising: retrieving a location identifier from the first data, the location identifier associated with the access network; and determining that the predetermined network service is not supported in the access network based at least in part on the location identifier.

G: The method according to paragraph F, wherein: the first data comprises a Session Initiation Protocol (SIP) header that includes an access-network-information (ANI) value; the ANI value comprises location information that includes at least one of a Location Area Code (LAC) or a Tracking Area Code (TAC); and the location identifier comprises at least a portion of the location information.

H: The method according to paragraph F or G, wherein the first data comprises a location header comprising the location identifier.

I: The method according to any of paragraphs F-H, further comprising, before determining the second data, determining that the first data includes authenticity information.

J: The method according to any of paragraphs A-I, wherein: the first data comprises a first Session Initiation Protocol (SIP) Feature-Caps header; the request for the predetermined network service comprises a capability value in the first Feature-Caps header; and the method further comprises determining, as the second data, a SIP request that either: comprises a second Feature-Caps header that does not include the capability value; or does not include a Feature-Caps header.

K: The method according to any of paragraphs A-J, further comprising determining, as the second data, a Session Initiation Protocol (SIP) registration request addressed to the core network system.

L: A telecommunications network comprising: a network-service system associated with a predetermined network service; an application-server system configured to perform first operations comprising: receiving first data associated with a terminal of the telecommunications network; determining that the first data includes a request for a predetermined network service; retrieving location information of the terminal from a location provider system; determining, based at least in part on the location information, that the predetermined network service is not supported in an access network to which the terminal is connected; and transmitting second data indicating that the predetermined network service is not supported in the access network; and a first anchoring network system configured to perform second operations comprising: receiving the second data; and in response, removing the network-service system from a signaling chain associated with the terminal.

M: The telecommunications network according to paragraph L, wherein: the telecommunications network further comprises a second anchoring network system configured to relay messages between the first anchoring network system and the application-server system; and the second operations comprise removing the network-service system from the signaling chain by transmitting a Session Initiation Protocol (SIP) REGISTER request to the second anchoring network system, wherein the SIP REGISTER request is not routed through the network-service system.

N: The telecommunications network according to paragraph L or M, wherein the first data comprises a Session Initiation Protocol (SIP) INVITE request, and the second data comprises a SIP MESSAGE request.

O: The telecommunications network according to any of paragraphs L-N, wherein the first data comprises a Session Initiation Protocol (SIP) INVITE request, and the second data comprises a SIP one hundred eighty-three response.

P: The telecommunications network according to any of paragraphs L-O, wherein: the telecommunications network further comprises the location provider system; the location provider system is configured to: receive identification information associated with the terminal from the application-server system; query a Mobility Management Entity (MME) for a location code associated with the identification information, the location code including at least one of a Location Area Code (LAC) or a Tracking Area Code (TAC); and provide the location information indicating whether or not the location code was provided by the MME in response to the query; and the application-server system is configured to determine that the predetermined network service is not supported in response to the location information indicating the location code was not provided by the MME.

Q: Long Term Evolution (LTE) user equipment (UE) comprising: a radio; and a controller connected with the radio and configured to: request a combined Evolved Packet System (EPS)/International Mobile Subscriber Identity (IMSI) attach to an LTE access network via the radio; receive an attach result via the radio; determine, based at least in part on the attach result, data indicating whether single-radio voice call continuity (SRVCC) is supported; and transmit, via the radio, a Session Initiation Protocol (SIP) request including the data.

R: The LTE UE according to paragraph Q, wherein: the SIP request includes at least a REGISTER or an INVITE request; and the data consists essentially of: a header name; and a header value indicating whether SRVCC is supported.

S: The LTE UE according to paragraph Q or R, wherein: the SIP request comprises a P-Access-Network-Info (PANI) header; and the data comprise an access-info header field of the PANI header.

T: The LTE UE according to any of paragraphs Q-S, wherein the controller is configured to: determine, in response to the attach result indicating a combined result of attach, that SRVCC is supported; and determine, in response to the attach result indicating other than a combined result of attach, that SRVCC is not supported.

U. A method comprising, by an anchoring network system of a telecommunications network: receiving first data from a terminal of the telecommunications network via a communications interface; extracting information from the first data, the information comprising at least identification information or location information; and determining, based at least in part on the information, that the predetermined network service is not supported.

V. The method according to paragraph U, further comprising, in response to the determining: determining second data that does not request the predetermined network service; and transmitting the second data to a core network system via the communications interface.

W. The method according to paragraph U or V, further comprising, in response to the determining: transmitting, to an anchoring network system, second data indicating that the predetermined network service is not supported.

X. The method according to paragraph W, further comprising, in response to the second data: removing a network-service system associated with the predetermined network service from a signaling chain associated with the terminal.

Y. The method according to paragraph X, the removing comprising: transmitting, by the anchoring network system, a Session Initiation Protocol (SIP) REGISTER request to a second anchoring network system, wherein the SIP REGISTER request is not routed through the network-service system.

Z. The method according to any of paragraphs U-Y, further comprising, in response to the determining: removing a network-service system associated with the predetermined network service from a signaling chain associated with the terminal.

AA. The method according to any of paragraphs U-Z, further comprising, in response to the determining: transmitting, by a first anchoring network system, a Session Initiation Protocol (SIP) REGISTER request to a second anchoring network system, wherein the SIP REGISTER request is not routed through a network-service system associated with the predetermined network service.

AB: A computer-readable medium, e.g., a computer storage medium, having thereon computer-executable instructions, the computer-executable instructions upon execution configuring a computer to perform operations as any of paragraphs A-J, M-P, Q-T, or U-AA recites.

AC: A device comprising: a processor; and a computer-readable medium, e.g., a computer storage medium, having thereon computer-executable instructions, the computer-executable instructions upon execution by the processor configuring the device to perform operations as any of paragraphs A-J, M-P, Q-T, or U-AA recites.

AD: A system comprising: means for processing; and means for storing having thereon computer-executable instructions, the computer-executable instructions including means to configure the system to carry out a method as any of paragraphs A-J, M-P, Q-T, or U-AA recites.

Conclusion

Various aspects described above permit allowing or disallowing access by a terminal to network services, e.g., based on whether the serving network supports those services. For example, service access can be controlled based on whether or not a terminal is roaming in a serving network. In some examples, the home network can support IMS or other services such as VoLTE calling, RCS, SMS over IP, or Presence. In some examples, access to some of these services may be restricted on serving networks. For example, access may be restricted based on the operator of the serving network, a combination of the operator and the user of the terminal, or a combination of the operator, the user, and the requested service. As discussed above, technical effects of various examples can include controlling bandwidth usage, reducing network load, and increasing network reliability.

Example components and data transmissions in FIGS. 1-3 and 8, example data exchanges in the call flow diagram of FIG. 7, and example blocks in the process diagrams of FIGS. 4-6 and 9-12 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Although some features and examples herein have been described in language specific to structural features and/or methodological steps, it is to be understood that the appended claims are not necessarily limited to the specific features or steps described herein. Rather, the specific features and steps are disclosed as preferred forms of implementing the claimed invention. For example, network 306, processors 312 and 326, and other structures or systems described herein for which multiple types of implementing devices or structures are listed can include any of the listed types, and/or multiples and/or combinations thereof.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order. Parenthetical comments in the Abstract are nonlimiting examples provided for ease of understanding.

What is claimed is:

1. A method comprising:
    receiving, at an application-server system, first data associated with a terminal of a telecommunications network via a communications interface;
    determining that the first data includes a first request for a predetermined network service;
    determining that the predetermined network service is not supported in an access network to which the terminal is connected based at least in part on location information associated with the terminal;
    transmitting second data to an anchoring network system via the communications interface, the second data indicating that the predetermined network service is not supported in the access network, the anchoring network system comprising a Proxy Call Session Control Function; and
    receiving, at the application-server system, a re-REGISTER request from the Proxy Call Session Control Function to a Serving Call Session Control Function.

2. The method according to claim 1, wherein the first request is a Session Initiation Protocol (SIP) INVITE request.

3. The method according to claim 1, wherein the predetermined network service comprises at least one of a Single-Radio Voice Call Continuity (SRVCC) or an Evolved SRVCC (eSRVCC).

4. The method according to claim 1, further comprising:
    determining that the predetermined network service is supported in a second access network; and
    allocating resources to support the predetermined network service for the terminal.

5. The method according to claim 1, further comprising retrieving the location information from a location provider system associated with the terminal associated with the access network.

6. The method according to claim 5, wherein retrieving the location information from the location provider system includes querying a Mobility Management Entity (MME) for the location information associated with identification information associated with the terminal.

7. The method according to claim 6, wherein:
    the first data comprises a Session Initiation Protocol (SIP) header that includes an access-network-information (ANI) value; and
    the ANI value includes the location information.

8. The method according to claim 1, further comprising removing, by the anchoring network system, the predetermined network service from a signaling chain associated with the terminal.

9. The method according to claim 1, wherein the location information is at least one of a Location Area Code (LAC) or a Tracking Area Code (TAC).

10. A telecommunications network comprising:
    receiving, at a first system, first data associated with a terminal of a telecommunications network;
    determining that the first data includes a request for a predetermined network service of the telecommunications network;
    determining, based at least in part on location information associated with the terminal, that the predetermined network service is not supported in an access network to which the terminal is connected; and
    notifying a second system that the predetermined network service is not supported in the access network to cause the second system to remove the predetermined network service from a signaling chain associated with the terminal.

11. The telecommunications network according to claim 10, wherein the first system is at least one of a Service Centralization and Continuity Application Server (SCCAS) or a Telephony Application Server (TAS).

12. The telecommunications network according to claim 10, wherein the first data comprises a Session Initiation Protocol (SIP) INVITE request and notifying the second system includes transmitting a SIP MESSAGE request.

13. The telecommunications network according to claim 10, further comprising retrieving the location information associated with the terminal from a location provider system.

14. The telecommunications network according to claim 10, wherein determining that the predetermined network service is not supported in the access network is in response to the location information indicating a location code was not provided by a Mobility Management Entity.

15. The telecommunications network according to claim 10, further comprising:
    transmitting second data to an anchoring network system via the communications interface, the second data indicating that the predetermined network service is not supported in the access network; and
    sending, by the anchoring network system, a second request for the predetermined network service for the terminal.

16. The telecommunications network according to claim 15, wherein the anchoring network system comprise Proxy Call Session Control Function and the second request is a re-REGISTER request from the Proxy Call Session Control Function to a Serving Call Session Control Function.

17. A method comprising:
receiving, at a location provider system, identification information associated with a terminal of an application-server system;
querying a Mobility Management Entity (MME) for a Location Area Code (LAC) associated with the identification information; and
sending, by the location provider system to the application-server system, the LAC and an indication that the LAC was not received from the MME.

18. The method according to claim 17, wherein the identification information includes at least one of an international mobile equipment identity (IMEI), a mobile country code (MCC), a mobile network code (MNC), a user identifier, or an identifier of a Mobile virtual network operator (MVNO).

19. The method according to claim 17, further comprising determining, by the application-server system, that a predetermined network service is not supported in an access network associated with the terminal in response to receiving the indication that the location code was not provided by the MME.

20. The method according to claim 19, further comprising, in response to determining that the predetermined network service is not supported by the access network, removing the predetermined network service from a signaling chain associated with the terminal.

* * * * *